United States Patent
Fukuda et al.

(10) Patent No.: US 6,930,987 B1
(45) Date of Patent: Aug. 16, 2005

(54) COMMUNICATION DEVICE COMMUNICATION METHOD, AND COMMUNICATION TERMINAL DEVICE

(75) Inventors: Kunio Fukuda, Tokyo (JP); Isao Kawashima, Kanagawa (JP); Yoshitaka Ukita, Tokyo (JP)

(73) Assignee: Sony Corporation, Tokyo (JP)

( * ) Notice: Subject to any disclaimer, the term of this patent is extended or adjusted under 35 U.S.C. 154(b) by 877 days.

(21) Appl. No.: 09/763,833

(22) PCT Filed: Jun. 22, 2000

(86) PCT No.: PCT/JP00/04110

§ 371 (c)(1),
(2), (4) Date: Feb. 27, 2001

(87) PCT Pub. No.: WO01/01655

PCT Pub. Date: Jan. 4, 2001

(30) Foreign Application Priority Data

Jun. 29, 1999 (JP) ............................... P11-183610
Nov. 12, 1999 (JP) ............................... P11-323446

(51) Int. Cl.[7] .............................................. H04Q 7/00

(52) U.S. Cl. ..................................... 370/328; 370/469

(58) Field of Search ............................... 370/338, 349, 370/400, 401, 310, 310.2, 328, 352–356, 370/363, 366, 383, 465, 466, 329; 709/227, 709/230, 249, 250

(56) References Cited

U.S. PATENT DOCUMENTS

| | | | |
|---|---|---|---|
| 5,745,733 A | | 4/1998 | Robinson .................... 395/500 |
| 5,764,899 A | * | 6/1998 | Eggleston et al. .......... 709/203 |
| 5,805,834 A | * | 9/1998 | McKinley et al. .......... 710/302 |
| 6,174,205 B1 | * | 1/2001 | Madsen et al. ............. 439/638 |
| 6,393,031 B1 | * | 5/2002 | Isomura ...................... 370/444 |
| 6,434,648 B1 | * | 8/2002 | Assour et al. .............. 710/305 |
| 6,560,443 B1 | * | 5/2003 | Vaisanen et al. ............. 455/73 |
| 6,577,643 B1 | * | 6/2003 | Rai et al. .................... 370/466 |
| 6,681,259 B1 | * | 1/2004 | Lemilainen et al. ........ 709/250 |
| 6,760,748 B1 | * | 7/2004 | Hakim ........................ 709/204 |
| 6,772,331 B1 | * | 8/2004 | Hind et al. .................. 713/151 |

FOREIGN PATENT DOCUMENTS

| | | | |
|---|---|---|---|
| JP | 10042057 | 2/1998 | .......... H04M 11/00 |
| JP | 10112738 | 4/1998 | ........... H04L 29/10 |

* cited by examiner

Primary Examiner—Ajit Patel
Assistant Examiner—Chirag Shah
(74) Attorney, Agent, or Firm—Jay H. Maioli

(57) ABSTRACT

A radio communication CPU controls each section of a radio communication device included in a short distance radio communication network by using network setting information in a network setting storage section. A connection relation with a communication network (for example, the Internet) is set and transmission/reception of data to/from equipment included in the communication network via the short distance radio communication network is controlled. Thus, the network setting or the like for connecting to the Internet or the like is simplified for each portable equipment existing in the short distance radio communication network.

26 Claims, 31 Drawing Sheets

| SYNC | PID | PAYLOAD | CRC |

COMMUNICATION DEVICE COMMUNICATION METHOD, AND COMMUNICATION TERMINAL DEVICE

TECHNICAL FIELD

This invention relates to a communication device, a communication method, and a communication terminal device which are suitable for a wireless LAN (local area network) system employing, for example, the Bluetooth system.

BACKGROUND ART

Recently, in the field of wireless LAN (local area network) system, there has been developed a system which employs the Bluetooth system for carrying out processing in conformity with the frequency hopping system using a radio wave of a band of 2.4 GHz and carrying out transmission/reception of data between equipments.

The Bluetooth system is a system for realizing ad hoc radio (RF) networking between a plurality of personal computers and devices, which is being cooperatively developed by corporations of various industries such as computers, telecommunication, networking and so on, utilizing the radio communication technology. The Bluetooth system was planned by the Bluetooth SIG (Special Interest Group) in which the following corporations have taken part: Intel, Ericsson, IBM, Nokia, and Toshiba (trademark registered). The Bluetooth system enables a notebook computer, a PDA (personal digital assistant), or a portable telephone to share information and various services with a personal computer through radio communications, and makes troublesome cable connection unnecessary. Such Bluetooth system is disclosed in "Bluetooth (TM) Special Interest Group, Bluetooth specification version 1.0".

Since the Bluetooth system is designed for ad hoc short distance connection, a standard communication range is within 10 m. According to the Bluetooth system, a "piconet" with the maximum number of connected devices equal to 8 and the communication range of 10 m is constructed by carrying out ad hoc multi-point connection, and a bandwidth of 1 Mbps is shared. In carrying out synchronous communication in accordance with the Bluetooth system, a transfer rate of 432.6 Kbps can be realized for both up communication and down communication, and therefore a rate approximately 10 times that of ordinary analog connection using a 56 K modem can be realized. On the other hand, in asynchronous communication in accordance with the Bluetooth system, communication at a higher speed is possible, and 721 Kbps for down communication and 57.6 Kbps for up communication are realized. Furthermore, the Bluetooth system also supports audio communication and enables setting of a maximum of 3 synchronous audio channels (at a transfer rate of 64 Kbps) at the same time. Simultaneous transfer of audio and data can be realized in one channel which provides a 64-Kbps synchronous audio link and an asynchronous data link. Such Bluetooth system can be used on various types of platforms and can realize radio communication at a low cost.

According to such Bluetooth system, an intelligent mechanism held by PC-based software can be realized in all kinds of electronic equipments. However, to realize practical application of the Bluetooth system, it is necessary to realize miniaturization and reduction in cost of transceiver components so as to incorporate them into the current notebook personal computers, PDA, portable telephones, portable head sets or the like. Since portable equipments normally use batteries, it is necessary to reduce the dissipation power.

In order to solve these problems, the Bluetooth system employs a system for compactly designing all logics and transceiver hardware. The transceiver hardware uses a radio frequency in a band of 2.4 GHz that can be used without permission and employs a diffusion system based on frequency hopping in order to prevent wire tapping and interference. In this frequency hopping, hopping is carried out 1600 times per second on 79 channels obtained by splitting the band every 1 MHZ (2.402 to 2.480 GHz). Also, according to the Bluetooth system, data is encrypted and devices that can access data are limited by password authorization, in order to improve the security of data transmission.

In a wireless LAN system 1100 employing the Bluetooth system as described above, wireless LAN modules 1110 of the Bluetooth system are mounted on a portable telephone 1101, a personal computer 1102, a digital camera 1103, and a portable information terminal 1104, respectively, as shown in FIG. 31. Thus, the portable telephone 1101, the personal computer 1102, the digital camera 1103 and the portable information terminal 1104 constituting the wireless LAN system 1100 can carry out transmission/reception of data between one another by carrying out transmission/reception of data using their respective wireless LAN modules 1110.

When connecting from the portable telephone 1101 of the wireless LAN system 1100 to the Internet 1300 via a mobile communication network 1200 by dial-up access, an Internet service provider 1301 in the Internet 1300 is accessed by the personal computer 1102, the digital camera 1103 or the portable information terminal 1104 via the wireless LAN system 1100 and the mobile communication network 1200, and connection to a WWW (world wide web) server 1302 in the Internet 1300 is made.

In this manner, with the wireless LAN system 1100, the personal computer 1102, the digital camera 1103 and the portable information terminal 1104 can be connected to the Internet 1300 through radio connection without having wired connection with the portable telephone 1101. Therefore, with the wireless LAN system 1100, the portability of the personal computer 1102, the digital camera 1103 and the portable information terminal 1104 can be improved. Also, with such wireless LAN system 1100, it is possible to connect to the Internet 1300 in the state where the user has the portable telephone 1101 in his/her bag and only carries a terminal such as the portable information terminal 1104 in hand.

The structure of a host equipment 1500 constituting the wireless LAN system 1100 will now be described with reference to FIG. 32. The host equipment 1500 is equivalent to an equipment operated by the user of the personal computer 1102, the digital camera 1103 or the portable information terminal 1104 of FIG. 31.

The host equipment 1500 is constituted by a communication control section 1510 which controls communication with the outside and is equivalent to the wireless LAN module 1110, and a host control section 1530 for controlling the equipment itself.

The communication control section 1510 has a radio communication unit 1511 for controlling radio communication within the wireless LAN system 1100, an antenna section 1512 for carrying out transmission/reception of data to/from each section constituting the wireless LAN system 1100, a base band control section 1513 for giving a hopping frequency pattern to the radio communication unit 1511, and an interface section 1514 for carrying out input/output of data with the host control section 1530.

The base band control section 1513 carries out modulation and demodulation processing of frequency hopping, processing for converting data handled in the communication control section 1510 into a predetermined format and transmitting the data via the communication control section 1510, and data conversion for converting the data received in the predetermined format and outputting the data to the host control section 1530.

The radio communication unit 1511 has a receiving section 1521 for carrying out processing for receiving data from the antenna section 1512, a transmitting section 1522 for carrying out processing for transmitting data from the antenna section 1512, a switch section 1523 for switching transmission of data from the transmitting section 1522 via the antenna section 1512 and output of data from the antenna section 1512 to the receiving section 1521, and a hopping synthesizer section 1524 for carrying out spectrum spreading based on frequency hopping with respect to the data in the receiving section 1521 and the transmitting section 1522.

Moreover, the communication control section 1510 has a RAM (random access memory) 1516, a ROM (read only memory) 1517, and a radio communication CPU (central processing unit) 1518 which are connected to a data bus 1515.

The radio communication CPU 1518 reads a control program for controlling each section constituting the communication control section 1510 from the ROM 1517 via the data bus 1515, thus generating a control signal. In this case, the radio communication CPU 1518 houses data into the RAM 1516 as a work space when necessary, and executes the control program. Thus, the radio communication CPU 1518 controls the base band control section 1513 and the radio communication unit 1511 so as to control communication with another equipment constituting the wireless LAN system 1100, and also controls the host control section 1530 via the interface section 1514.

The host control section 1530 in the host equipment 1500 has an interface section 1531 for carrying out input/output of signals with the interface section 1514 of the communication control section 1510. In the host control section 1530, a network setting storage section 1533 for storing network setting information such as the server address of the Internet service provider 1301 when the host equipment 1500 is connected to the Internet, an individual information storage section 1534 for storing individual information such as the mail address, password and the like of each user held by each host equipment 1500, and a CPU 1535 for controlling these sections are connected via a data bus 1532.

In such host equipment 1500, when connecting to the Internet 1300, first, the network setting information stored in the network setting storage section 1533 and the individual information stored in the individual information storage section 1534 are outputted to the communication control section 1510, and then, the radio communication unit 1511 and the base band control section 1513 are controlled so that connection setting with the Internet 1300 is carried out by the radio communication CPU 1518 of the communication control section 1510 using the network setting information and the individual information, thus establishing connection between the host equipment 1500 and the WWW server 1302.

To add the wireless LAN function of the Bluetooth system to each equipment, two techniques are considered. The first technique is to provide the wireless LAN function as a built-in function in the equipment, and the second technique is to store the wireless LAN function of the Bluetooth system on a PCMCIA (Personal Computer Memory Card International Association) card and connect it to another equipment.

FIG. 33 shows protocol stacks 1610, 1620 mounted on the portable telephone 1101 and the portable information terminal 1104 in connecting to the Internet 1300 by using the wireless LAN system 1100 having the wireless LAN function of the built-in type according to the first technique.

The protocol stack 1610 and the protocol stack 1620 have a physical layer (PHY), a media access control layer (MAC) and a logical link control layer (LLC) for realizing the wireless LAN system 1100 of the Bluetooth system, as lower three layers. Using the protocols of these lower three layers, the portable telephone 1101 and the portable information terminal 1104 carry out transmission/reception of data within the wireless LAN system 1100.

On the layer above the LLC of the protocol stack 1620, PPP (point to point protocol) is mounted, having a protocol necessary for dial-up access to the Internet 1300. On the layers above the PPP, IP (Internet protocol) and TCP (transmission control protocol) necessary for connection to the Internet 1300 are mounted, and an application layer (AP) for preparation of user data is further mounted.

In the protocol stack 1610, the protocols for realizing the Bluetooth system are mounted as the lower three layers similar to those of the protocol stack 1620, and a layer for using the mobile communication network such as W-CDMA (wide band-code division multiple access) or the like is mounted thereon, thus setting a data communication mode to realize connection to the Internet 1300 via the mobile communication network 1200.

FIG. 34 shows protocol stacks 1610, 1630, and 1640 mounted on the portable telephone 1101, the PCMCIA card 1105, and the portable information terminal 1104 in storing the wireless LAN function onto the PCMCIA card to realize the wireless LAN system 1100 according to the second technique.

The wireless LAN function for constructing the wireless LAN system 1100 of the Bluetooth system is built in the PCMCIA card 1105, and a physical layer (PHY), a medium access control layer (MAC) and a logical link control layer (LLC) for realizing the Bluetooth system are provided as lower three layers, similarly to the protocol stack 1610 of the portable telephone 1101. In the protocol stack 1630 of the PCMCIA card 1105, PCMCIA I/F is mounted as the upper layer above the LLC.

In the protocol stack 1640 of the portable information terminal 1104, PPP, IP, and TCP are mounted as the upper layers above the PCMCIA I/F layer, and AP and transmission/reception of user data are provided as the uppermost layer.

However, the first technique and the second technique for constructing the wireless LAN system 1100 as described above have the following problems.

That is, in the first technique, since the protocol stacks for realizing the wireless LAN system 1100 must be built in the equipments 1101, 1104 constituting the wireless LAN system 1100, the burdens on the equipments in terms of hardware and software are increased, complicating the equipments 1101, 1104.

Specifically, to provide the built-in wireless LAN function, it is necessary to mount the wireless LAN module 1110 on the equipments 1101, 1104, and also to mount various protocols for connection to the Internet 1300 on the equipment 1104 as shown in FIG. 33. Thus, in the first technique, the cost for manufacturing the equipments 1101, 1104 is increased and their designs are often redundant for users who do not make connection to the Internet 1300.

In the second technique, though connector joint with the equipments 1101, 1105, 1104 constituting the wireless LAN system 1100 can be realized by mounting the wireless LAN function on the PCMCIA card 1105, it is necessary to mount various protocols for connection to the Internet 1300 on the equipment 1104 as shown in FIG. 34 and there is also a problem of cost similar to that of the first technique. Moreover, since the PCMCIA card 1105 employs a parallel interface in the form of bus, the casing of the equipment 1104 on which the PCMCIA card is mounted is increased in size, making it difficult to apply the card to a small-size portable equipment.

Furthermore, the equipments 1101 to 1104 constituting the wireless LAN system 1100 need to store the network setting information and the individual information such as the address of the Internet service provider 1301, mail address, password and the like in connecting the Internet 1300, into the network setting storage section 1533 and the individual information storage section 1534, as shown in FIGS. 31 and 32.

Therefore, the user must set the network setting information and the individual information for each of the equipments 1101 to 1104, and with a portable equipment having a poor man-machine interface function, the operation for setting the network setting information and the individual information is troublesome and generates a large burden.

Particularly, when carrying out processing for changing the Internet service provider 1301 or the like, it is necessary to change the setting related to network connection of each of the plurality of equipments 1101 to 1104 constituting the wireless LAN system 1100.

DISCLOSURE OF THE INVENTION

In view of the foregoing status of the art, it is an object of the present invention to provide a communication device, a communication method and a communication terminal device which enable simplification of network setting or the like for connection to the Internet or the like with respect to each portable equipment constituting the wireless LAN system.

In order to solve the foregoing problems, a communication device according to the present invention comprises: wired communication means for providing/receiving data via physical connection means to/from a mounted host equipment; short distance radio communication means for transmitting/receiving data to/from an external communication network via a short distance radio communication network; storage means in which communication setting information as information related to the communication network is stored; and communication control means for setting a connection relation with the communication network via the short distance radio communication network on the basis of the communication setting information stored in the storage means, and controlling transmission/reception of data between the communication network and the host equipment.

A communication method according to the present invention comprises the steps of: using communication setting information as information related to a communication network outside a short distance radio communication network, stored in a communication device, so as to set a connection relation between a radio control device and the communication network via the short distance radio communication network; and carrying out transmission/reception of data between the communication device and the communication network via physical connection means by using the connection relation between the communication device and the communication network, and carrying out transmission/reception between data between a host equipment and the communication device, thus controlling transmission/reception of data between the host equipment and the communication network.

Another communication device according to the present invention comprises: wired communication means for providing/receiving data via physical connection means to/from a mounted host equipment; short distance radio communication means for transmitting/receiving data to/from an external communication network via a short distance radio communication network; storage means in which communication setting information as information related to the communication network is stored; and communication control means for setting a connection relation with the communication network via the short distance radio communication network on the basis of the communication setting information stored in the storage means, and controlling transmission/reception of data between the communication network and the host equipment; the wired communication means, the short distance radio communication means, the storage means, and the communication control means being housed in a single casing; wherein the wired communication means is arranged on one side of the communication control means, and the short distance radio communication means is arranged on the other side of the communication control means.

Another communication device according the present invention comprises, in a casing constituted to have a predetermined outer dimension that allows free attachment/ detachment of at least a part thereof to/from a recessed connection part provided in a host equipment: wired communication means for providing/receiving data via physical connection means to/from the mounted host equipment; short distance radio communication means for transmitting/ receiving data to/from an external communication network via a short distance radio communication network; storage means in which communication setting information as information related to the communication network is stored; and communication control means for setting a connection relation with the communication network via the short distance radio communication network on the basis of the communication setting information stored in the storage means, and controlling transmission/reception of data between the communication network and the host equipment.

A communication terminal device according to the present invention comprises: public communication connection means operated by a user so as to be connected to a public communication network for providing/receiving data; short distance radio communication means for transmitting/ receiving data to/from another equipment included in a short distance radio communication network via the short distance radio communication network; communication setting information storage means in which communication setting information as information related to an external communication network to be connected via the public communication network is stored; communication connection setting means for setting connection with the communication network via the public communication network by using the communication setting information stored in the communication setting information storage means; and control means for controlling to carry out transmission/reception of data between said another equipment and the communication network by using a connection relation with the communication network set by the communication connection setting means.

Other object and specific advantages of the present invention will be clarified further in the following description of embodiments.

BEST MODE FOR CARRYING OUT THE INVENTION

Preferred embodiments of the present invention will now be described in detail with reference to the drawings.

Figure 1:
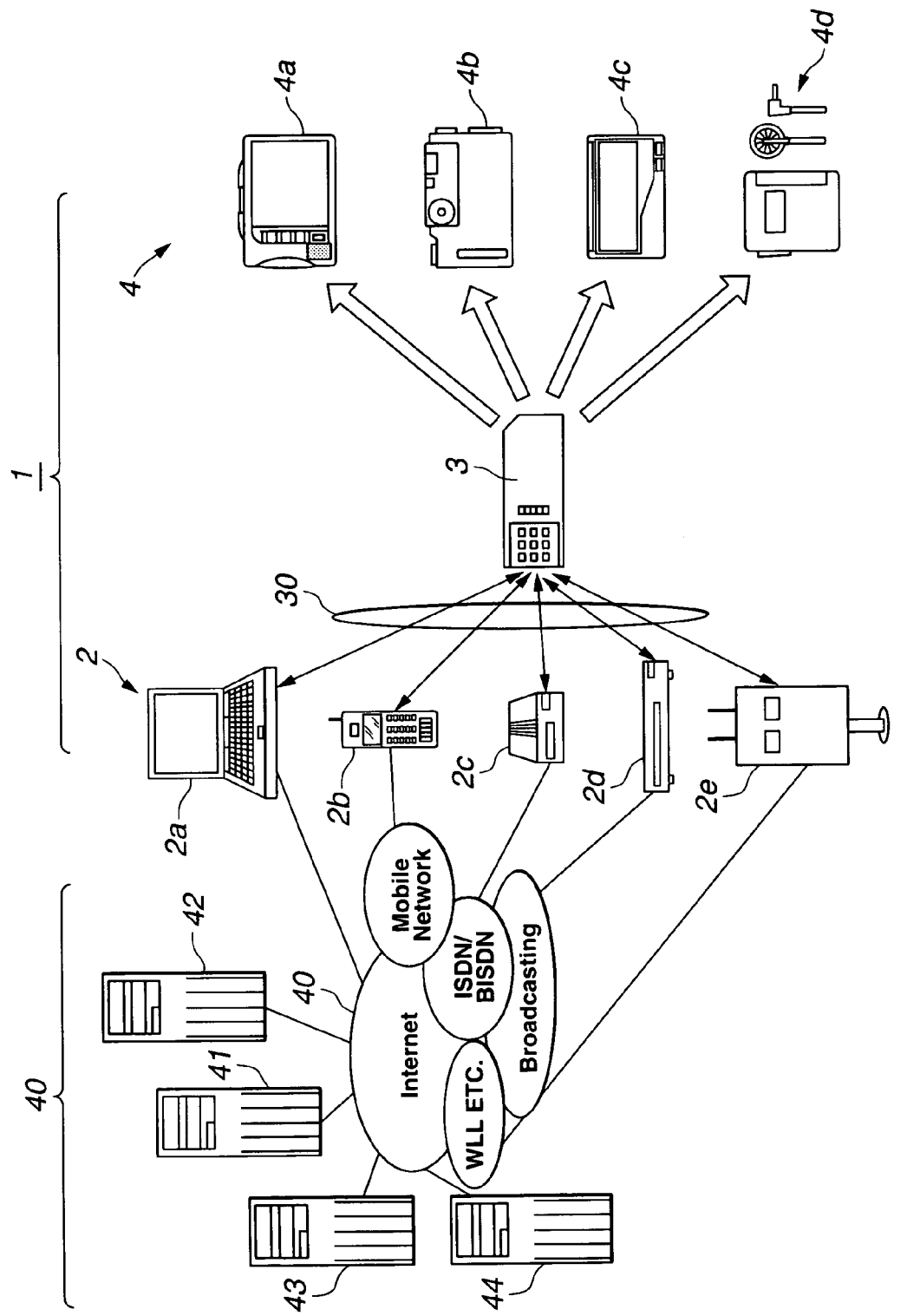
FIG. 1 shows a network including a wireless LAN system according to the present invention.
Figure 2:
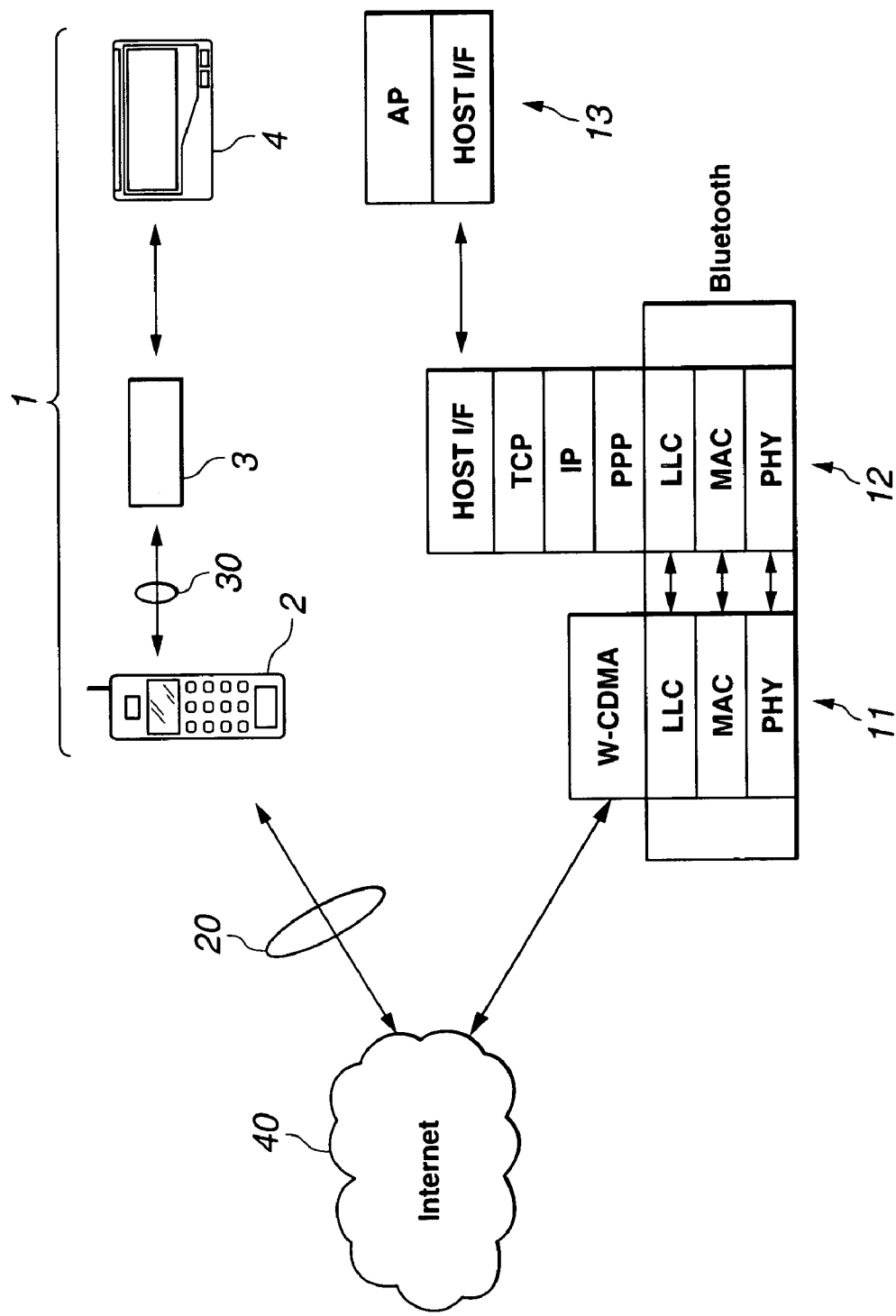
FIG. 2 shows the structure of the wireless LAN system according to the present invention and protocol stacks for respective equipments constituting the wireless LAN system.

The present invention is applied to a wireless LAN (local area network) system constituted, for example, as shown in FIGS. 1 and 2.

As shown in FIG. 1, in a wireless LAN system 1 connected to a public communication network 40, the Bluetooth system is employed to realize data communication among a communication equipment 2 (2a to 2e) as gateway, a radio communication device 3, and a host equipment 4 on which the radio communication device 3 is mounted.

The Bluetooth system is the name of a short distance radio communication technique for which five Japanese and European corporations started standardization activity in May 1998. In accordance with the Bluetooth system, a short distance radio communication network having a maximum data transmission rate of 1 Mbps (in effect, 721 Kbps) and a maximum transmission distance of approximately 10 m is constructed to carry out data communication. In the Bluetooth system, radio waves are transmitted and received between the host equipments 4 (4a to 4d) by employing a spread spectrum technique of the frequency hopping system, in which 79 channels each having a bandwidth of 1 MHZ are set in the ISM (Industrial Scientific Medical) frequency band of a 2.4-GHz band that can be used without permission and the channel is switched 1600 times per second.

A slave-master system is applied to the respective host equipments 4 included in the short distance radio communication network employing the Bluetooth system, so that these equipments are classified into a master equipment that determines the frequency hopping pattern and slave equipments as counterparts controlled by the master equipment, depending on the processing contents. The master equipment can be connected with seven slave equipments at a time and can carry out data communication simultaneously. A subnet constituted by the total of eight equipments consisting of the master equipment and the slave equipments is referred to as "piconet". The host equipment 4 in the piconet, that is, as the slave equipment included in the wireless LAN system 1, can be the slave equipment in two or more piconets at the same time.

The wireless LAN system 1 shown in FIG. 1 is constituted by the communication equipment 2 (2a to 2e) for carrying out transmission/reception of data to/from the public communication network 40 such as the Internet, the radio communication device 3 for carrying out transmission/reception of a control packet including user data and the like to/from the communication equipment 2 via a short distance radio communication network 30 in accordance with the Bluetooth system, and the host equipment 4 (4a to 4d) for carrying out input/output of the control packet including user data and the like to/from the radio communication device 3.

The host equipment 4 is an electronic device which is mechanically connected with the radio communication device 3 and which is operated by the user. The host equipment 4 includes, for example, a PDA (personal digital assistant) 4a, a digital camera 4b, a mail processing terminal 4c, an EMD (electronic music distribution) terminal 4d and the like.

The communication equipment 2 is connected to the radio communication device 3 via the short distance radio communication network 30 and also connected to the public communication network 40. The communication equipment 2 is the gateway for connecting the radio communication device 3 with the public communication network 40.

The communication equipment 2 includes a personal computer 2a having a modem or the like for connecting to the public communication network 40, a portable telephone 2b employing, for example, the cdma One (code division multiple access) system or the W-CDMA (wide band-code division multiple access) system, a TA/modem 2c, an STB (set top box) 2d, and a quasi-public system 2e such as a base station for connecting the radio communication device 3 conformable to the Bluetooth system with the public communication network 40.

The public communication network 40 includes, for example, the Internet connected to the personal computer 2a via a telephone line, a mobile communication network (or mobile network) connected to the portable telephone 2b, ISDN (integrated services digital network)/B (broadband)-ISDN connected to the TA/modem 2c, a satellite communication network (or broadcasting) connected to the STB 2d, WLL (wireless local loop) connected to the quasi-public system 2d, and the like.

The Internet included in the public communication network 40 includes an information providing server 41, a mail server 42, an EMD server 43, and a community server 44. The information providing server 41 receives a request from the host equipment 4 via the radio communication device 3 and the communication equipment 2, and transmits information corresponding to the request to the host equipment 4. The mail server 42 manages electronic mails and transmits/receives electronic mails to/from the host equipment 4 via the communication equipment 2 and the radio communication device 3. Moreover, the EMD server 43 transmits music information to the EMD terminal 4d of the host equipment 4 via the communication equipment 2 and the radio communication device 3, and thus manages music providing services. Furthermore, the community server 44 provides downloading services for town information and news information to the digital camera 4b of the host equipment 4, and manages uploading of information from the host equipment 4.

In the following description, the wireless LAN system 1 is described which is constituted by the portable telephone (communication equipment) 2 for carrying out transmission/reception of data to/from a mobile communication network 20, the radio communication device 3 for carrying out transmission/reception of a control packet including user data or the like to/from the portable telephone 2 via the short distance radio communication network 30 in accordance with the Bluetooth system, and the host equipment 4 for carrying out input/output of a control packet including user data with the radio communication device 3, as shown in FIG. 2, to simplify the description.

The portable telephone 2 has a function to connect to the public communication network 40 via the mobile communication network 20 on the basis of a control packet from the radio communication device 3. A command to connect the portable telephone 2 with the public communication network 40 via the short distance radio communication network 30 of the Bluetooth system is issued from the radio communication device 3.

The host equipment 4 is, for example, a personal computer, a digital camera, a portable information terminal or the like, and is operated by the user. The host equipment 4 has a serial interface to connect with the radio communication device 3 and this interface enables mechanical attachment/detachment of the host equipment 4 to/from the radio communication device 3 via a connector.

Figure 3:
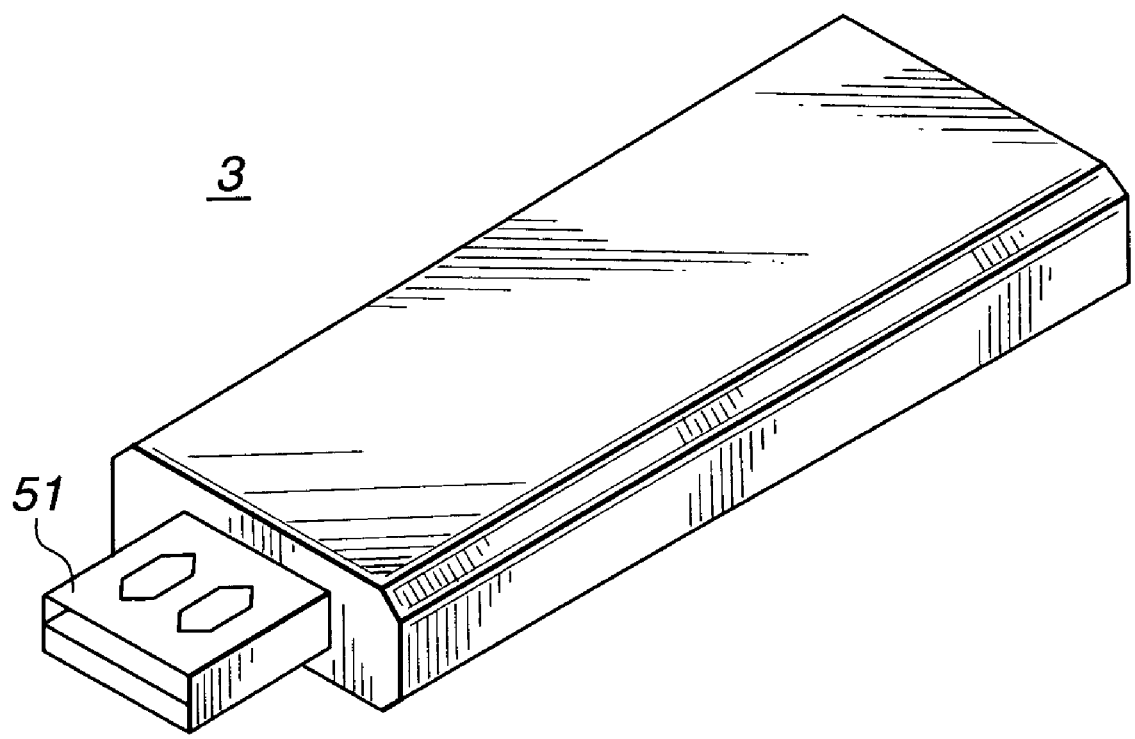
FIG. 3 is a perspective view showing the external structure of a radio communication device constituting the wireless LAN system according to the present invention.

The radio communication device 3 has an external structure, for example, as shown in FIG. 3. The radio communication device 3 has a USB connector 51 conformable to the USB (universal serial bus) standard. The radio communication device 3 is mechanically connected with the host equipment 4 by inserting the USB connector 51 into a recessed connection part provided in the host equipment 4 conformable to the USB standard. As the radio communication device 3 is connected with the host equipment 4, the radio communication device 3 carries out input/output of a control packet with the host equipment 4.

Figure 4:
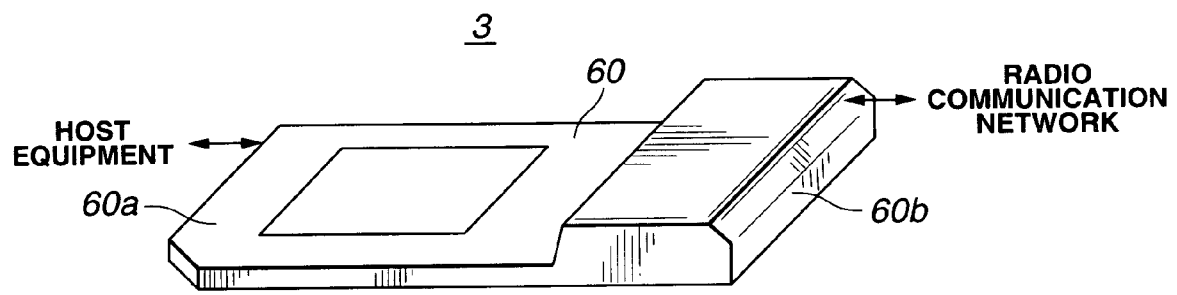
FIG. 4 is a perspective view showing the external structure of another radio communication device included in the wireless LAN system according to the present invention.

Alternatively, the radio communication device 3 may be constituted as shown in FIG. 4. The radio communication device 3 in this case has a semiconductor chip for realizing the above-described function of the Bluetooth system, an antenna, a flash memory for storing user data and the like, which are housed in a casing 60. The casing 60 of the radio communication device 3 is formed in a plate-like shape and its other end 60*b* has a thickness greater than that of its one end 60*a*.

Figure 5:
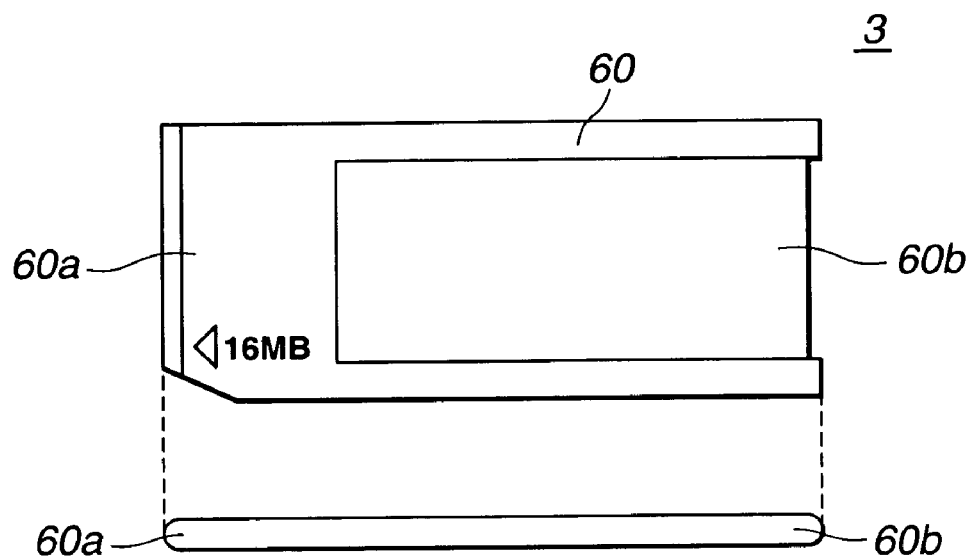
FIG. 5 is a plan view showing the external structure of still another radio communication device included in the wireless LAN system according to the present invention.

Furthermore, the radio communication device 3 may also be constituted as shown in FIG. 5. The radio communication device 3 in this case has a semiconductor chip for realizing the function of the above-described function of the Bluetooth chip, an antenna, a flash memory and the like housed in a casing 60, similarly to the radio communication device 3 shown in FIG. 4. The casing 60 of the radio communication device 3 is formed in a plate-like shape, and its one end 60*a* and its other end 60*b* have the same thickness.

Figure 6:
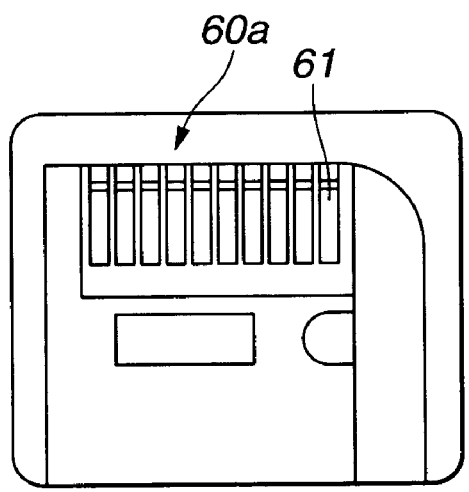
FIG. 6 is a bottom view showing the external structure of still another radio communication device included in the wireless LAN system according to the present invention.

In the radio communication device 3 shown in FIGS. 4 and 5, a plurality of connection terminals 61 are provided on the one end 60*a* of the casing 60, as shown in FIG. 6. By having the plurality of connection terminals 61, the radio communication device 3 is electrically connected with the host equipment 4. The radio communication device 3 has a 10-pin structure including at least a terminal for detecting the attachment to/detachment from the host equipment 4, a terminal for inputting/outputting a control packet with the host equipment 4, and the like.

Figures 7A, 7B:
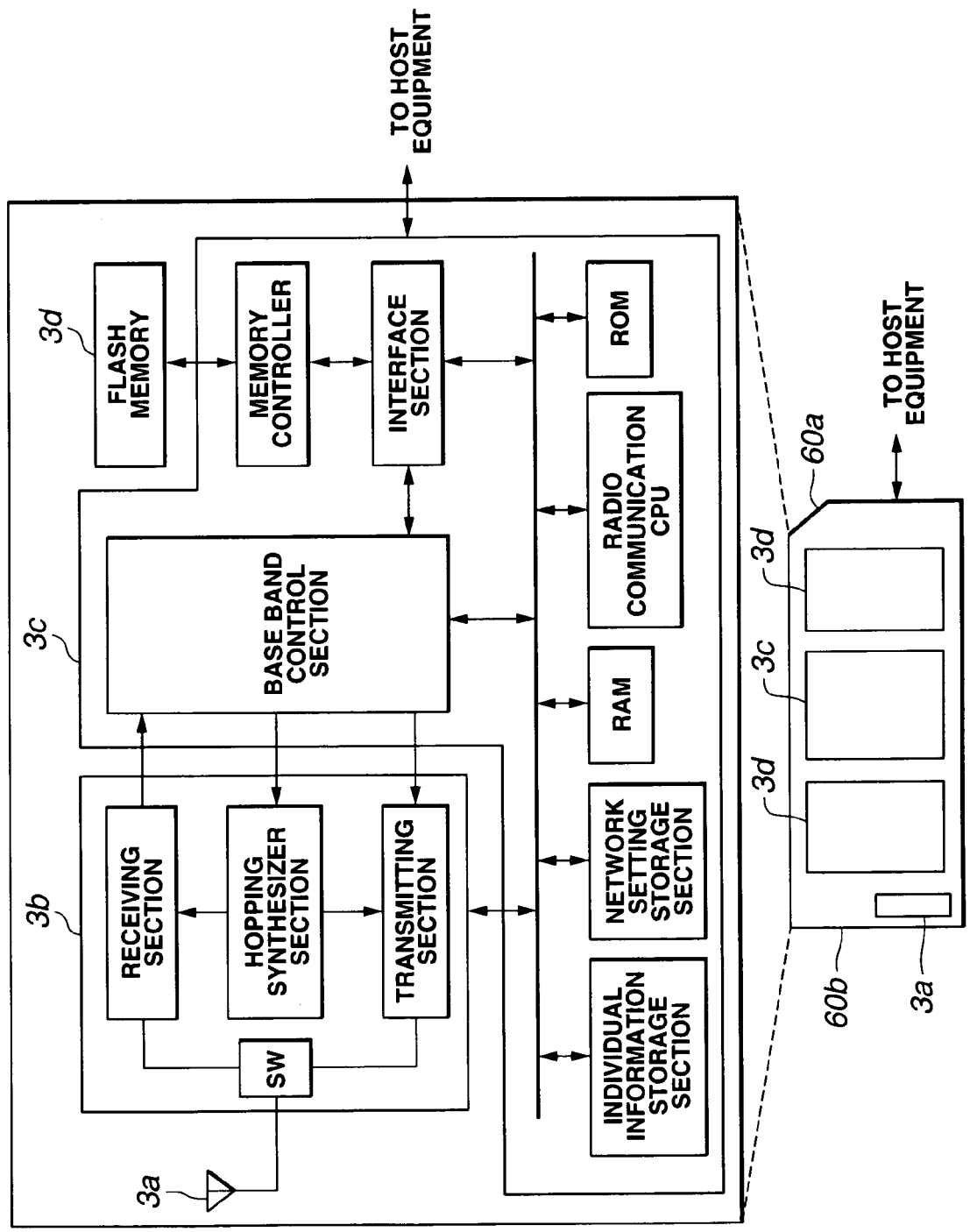
FIG. 7A is a block diagram showing the internal structure of the radio communication device included in the wireless LAN system according to the present invention.
FIG. 7B is a block diagram for explaining the arrangement of each section constituting the radio communication device.

The radio communication device 3 having the external structure as shown in FIGS. 3 to 6 has an internal structure as shown in FIGS. 7A and 7B. The radio communication device 3 has various chips including an antenna section 3*a*, an RF module 3*b*, a base band processing section (large scale integrated circuit) 3*c*, and a flash memory 3*d*, which are housed in the single casing 60, as shown in FIG. 7A. In the RF module 3*b*, a switch section (SW), a receiving section, a transmitting section, and a hopping synthesizer section are housed. In the base band processing section 3*c*, a base band control section, an interface section, an individual information storage section, a network setting storage section, a RAM (random access memory), a radio communication CPU (central processing unit), a ROM (read only memory), and a memory controller are housed. The various sections housed in the RF module 3*b* and the base band processing section 3*c* will be described later.

The sections 3*a* to 3*d* are arranged and housed in the casing 60 in the order of the antenna section 3*a*, the RF module 3*b*, the base band processing section 3*c*, and the flash memory 3*d* from the other end 60*b* toward the one end 60*a*, as shown in FIG. 7B.

Figure 8:
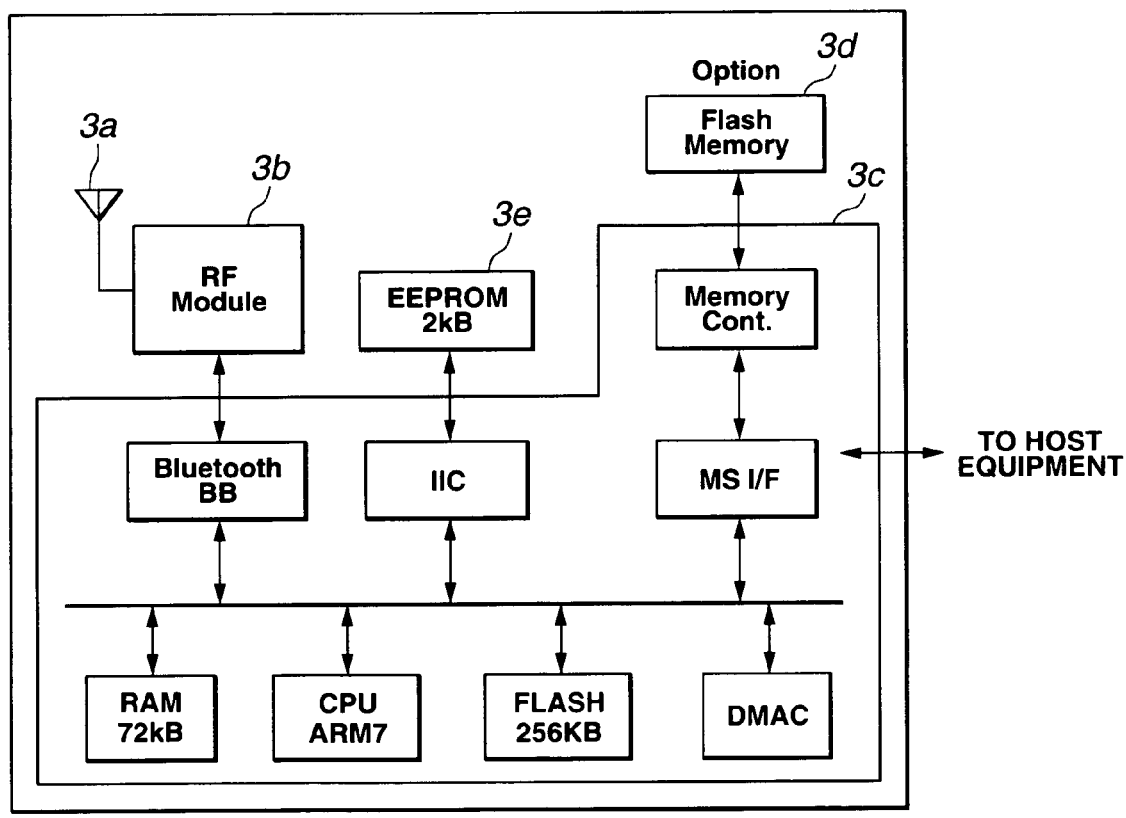
FIG. 8 is a block diagram showing another example of the internal structure of the radio communication device included in the wireless LAN system according to the present invention.

The sections 3*a* to 3*d* housed in the radio communication device 3 are not limited to the structure shown in FIGS. 7A and 7B, and may also be constituted as shown in FIG. 8. The structure shown in FIG. 8 differs in that an EEPROM (electrically erasable and programmable read only memory) 3*e* is provided in addition to the antenna section 3*a*, the RF module 3*b* and the base band processing section 3*c*. Moreover, in the base band processing section 3*c* shown in FIG. 8, a DMAC (direct memory access controller), a flash memory of 256 KB, a CPU, a RAM of 72 KB, a base band control section, an interface circuit (IIC) with respect to the EEPROM 3*e*, and an MS I/F (memory stick (trademark) interface) conformable to the existing memory card standard are connected to a data bus, and a memory controller is further provided.

Figures 9A, 9B:
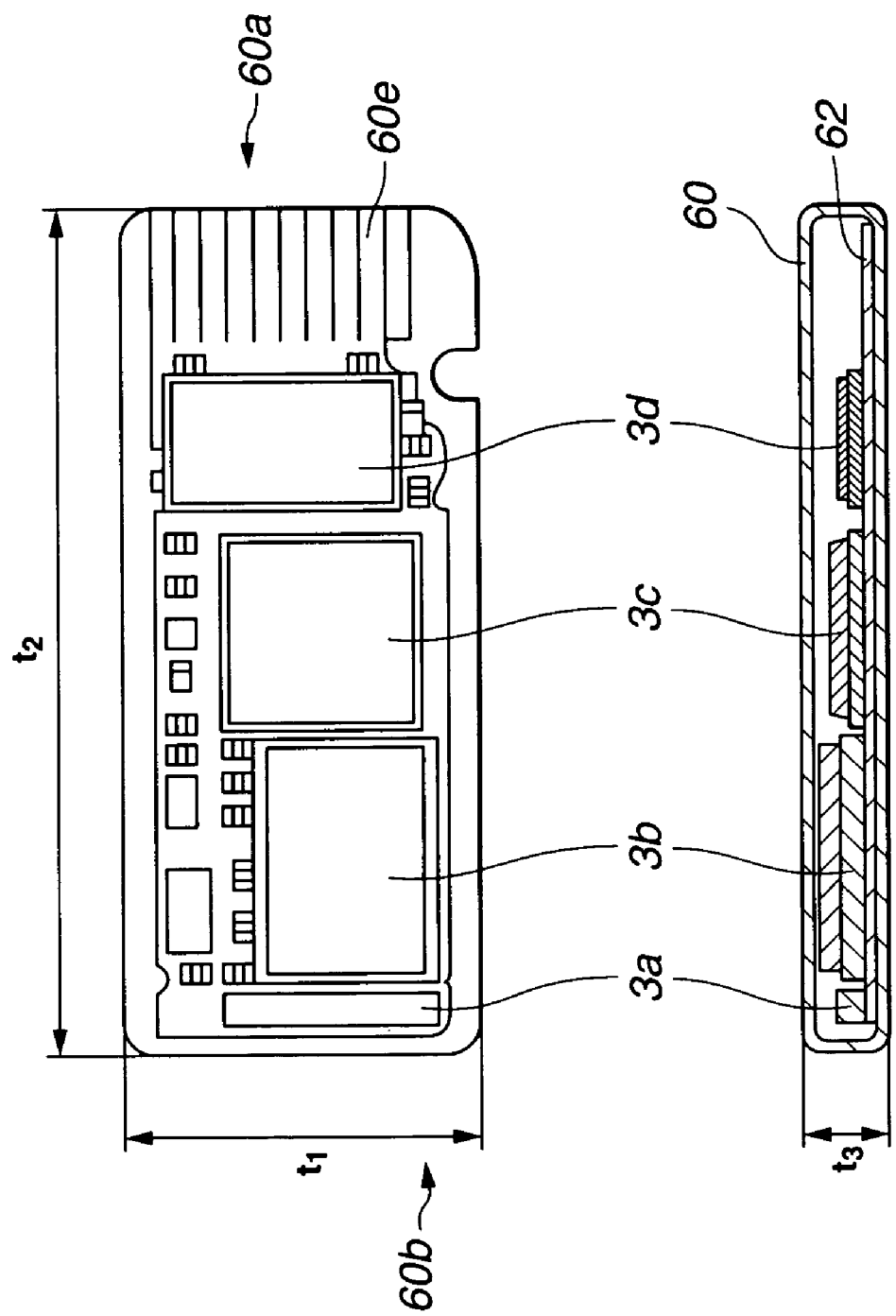
FIG. 9A is a plan view showing the internal structure of the radio communication device included in the wireless LAN system according to the present invention.
FIG. 9B is a cross-sectional view for explaining the arrangement of each section constituting the radio communication device.

More specifically, the radio communication device 3 is constituted as shown in FIGS. 9A and 9B. The radio communication device 3 has a board 62 inside the casing 60, and the antenna section 3*a*, the RF module 3*b*, the base band processing section 3*c* and the flash memory 3*d* are mounted on the board 62. Moreover, the radio communication device 3 has a 10-pin terminal section 60*e* on the other end 60*b*. As these sections 3*a* to 3*d* are formed on the board 62, electrical connection via the board 62 is realized.

The casing 60 of the radio communication device 3 has, for example, a longitudinal dimension $t_1$ of 21.45 mm, a lateral dimension $t_2$ of 50.0 mm, and a height $t_3$ of 2.8 $\mu$m. The antenna section 3*a* is made of a chip antenna integrated on the board and has, for example, a longitudinal dimension of 9.5 mm, a lateral dimension of 2.0 mm, and a height of 1.5 $\mu$m. The base band processing section 3*c* has a longitudinal dimension of 9 mm and a lateral dimension of 9 mm.

Figure 10:
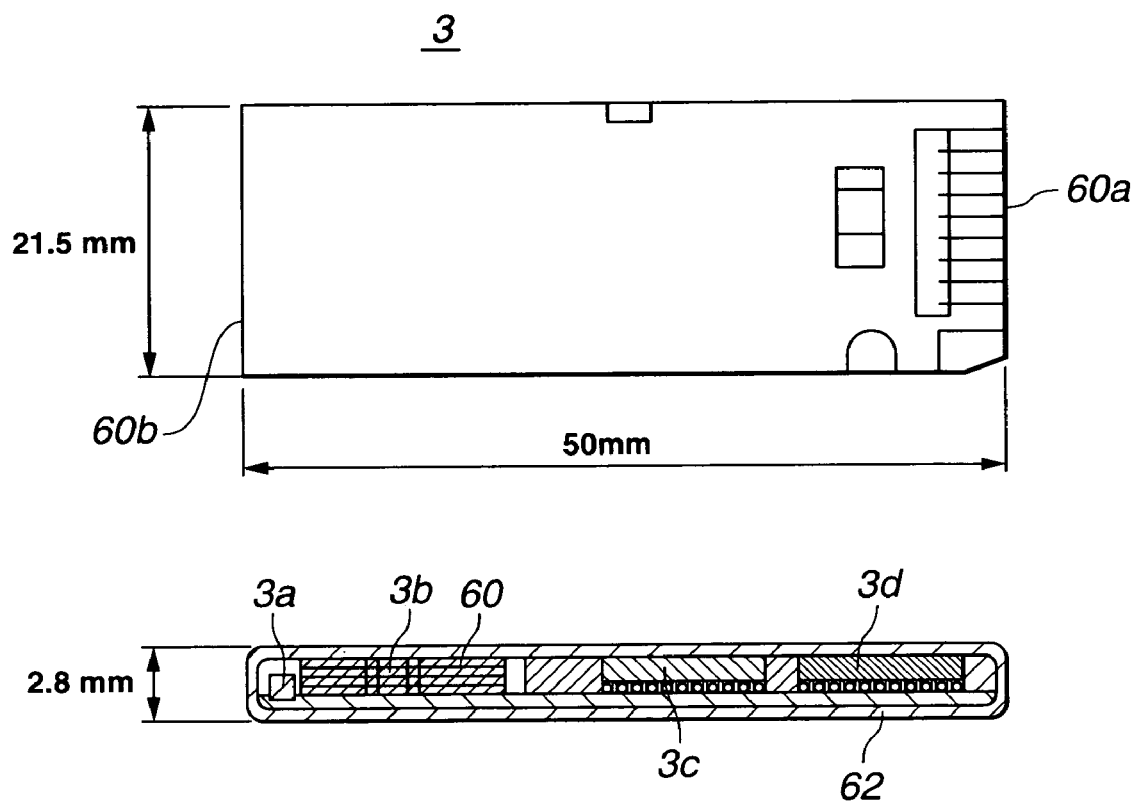
FIG. 10 is a plan view showing the back side of the radio communication device included in the wireless LAN system according to the present invention and a cross-sectional view showing the internal structure of the radio communication device.

A mounting method for mounting such antenna section 3*a*, RF module 3*b*, base band processing section 3*c*, flash memory 3*d* and terminal section 60*e* inside the casing 60 will be described with reference to FIG. 10. In FIG. 10, from the other end 60*b* of the radio communication device 3, the antenna section 3*a*, the RF module 3*b*, the base band processing section 3*c*, and the flash memory 3*d* are mounted and arranged on the board 62. The mounting method for the antenna section 3*a*, a function element, the RF module 3*b* and the base band processing section 3*c* will now be described.

Figure 11:
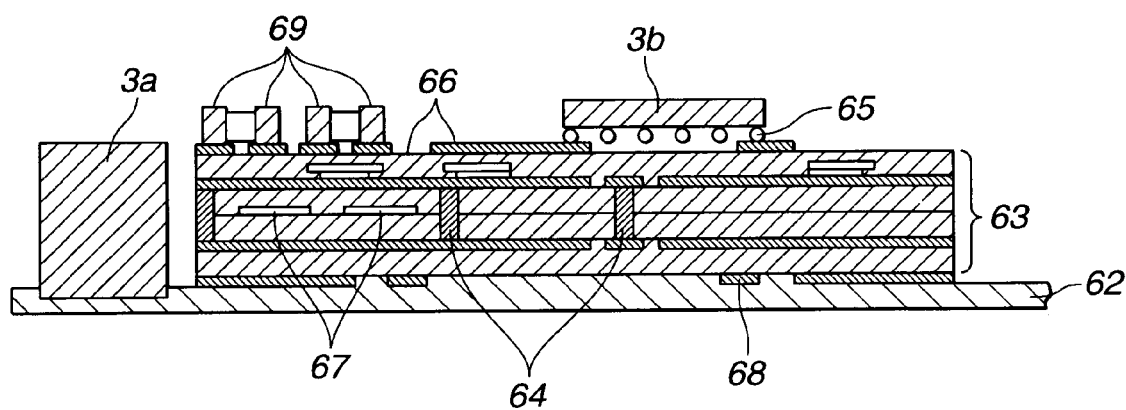
FIG. 11 is a cross-sectional view showing an antenna section mounted on a board and an RF module mounted on a multilayer board.

The antenna section 3*a* is a mounted chip antenna mounted in the board 62. The antenna section 3*a* may also be another antenna such as a bow-tie antenna, an inverted F antenna, a patch antenna, or a dipole antenna. As shown in FIG. 11, the antenna section 3*a* is formed integrally with the board 62 arranged in the casing 60 and is mounted in the state of being embedded in the board 62. In the radio communication device 3, the shape of the other end 60*b* of the casing 60 is deformed as shown in FIG. 4 or FIG. 5, depending on the type of the antenna section 3*a* to be used.

Figure 12:
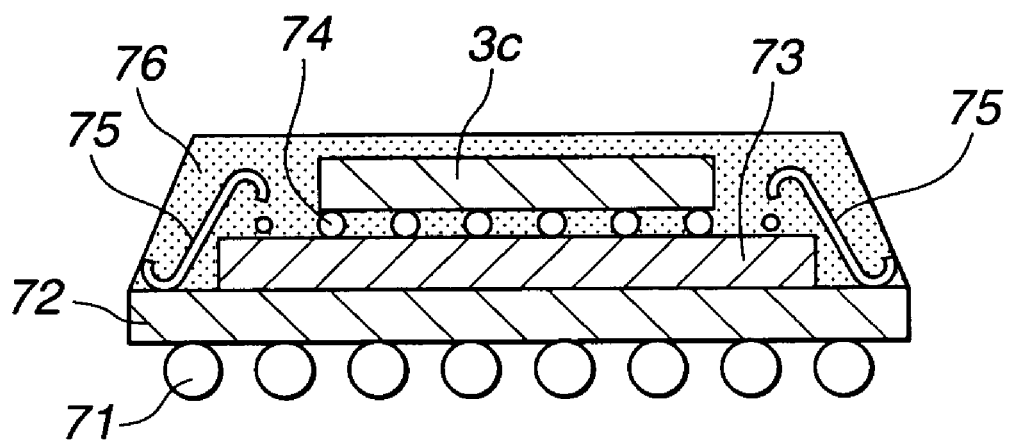
FIG. 12 is a cross-sectional view for explaining the mounting of a base band processing section on the board.

The RF module 3*b* and the base band processing section 3*c* are mounted on a multilayer board 63 formed on the board 62, as shown in FIGS. 11 and 12. In this case, the multilayer board 63 has a four-layer structure, in which a through-hole 64 having a metal film formed on its inner wall is formed so as to realize conduction among the respective layers. Thus, in the radio communication device 3, electrical conduction among the antenna section 3*a*, the RF module 3*b*, the base band processing section 3*c*, the flash memory 3*d* and the terminal section 60*e* is secured and input/output of a packet is carried out among the respective sections.

The RF module 3*b* is mounted on a metal pattern formed on the multilayer board 63 via a flip-chip connecting section 65 by using a flip-chip technique on the multilayer board 63. On the multilayer board 63 where the RF module 3*b* is mounted, a capacitor 66 and a resonator (filter) 67 are mounted as they are built between the layers, and an inductor 68 is mounted on the back side of the multilayer board 63. Moreover, a chip component 69 is mounted on the multilayer board 63.

When mounting the base band processing section 3*c* on the multilayer board 63, a wiring board 72, the base band processing section 3*c*, a flip-chip connecting section 73, and a flash ROM are sequentially stacked on solder balls 71, as shown in FIG. 12, and in the state where these are integrated, the base band processing section 3*c* is mounted on the multilayer board 63 by using the flip-chip technique. In this case, the base band processing section 3*c* secures electrical conduction of the adjacent RF module 3*b* and flash memory 3d by connecting a wire 75 by a wire bonding technique. Moreover, when mounting the base band processing section 3c, a radio absorptive material 76 is formed in order to prevent radio interference with the other sections.

Figure 13:
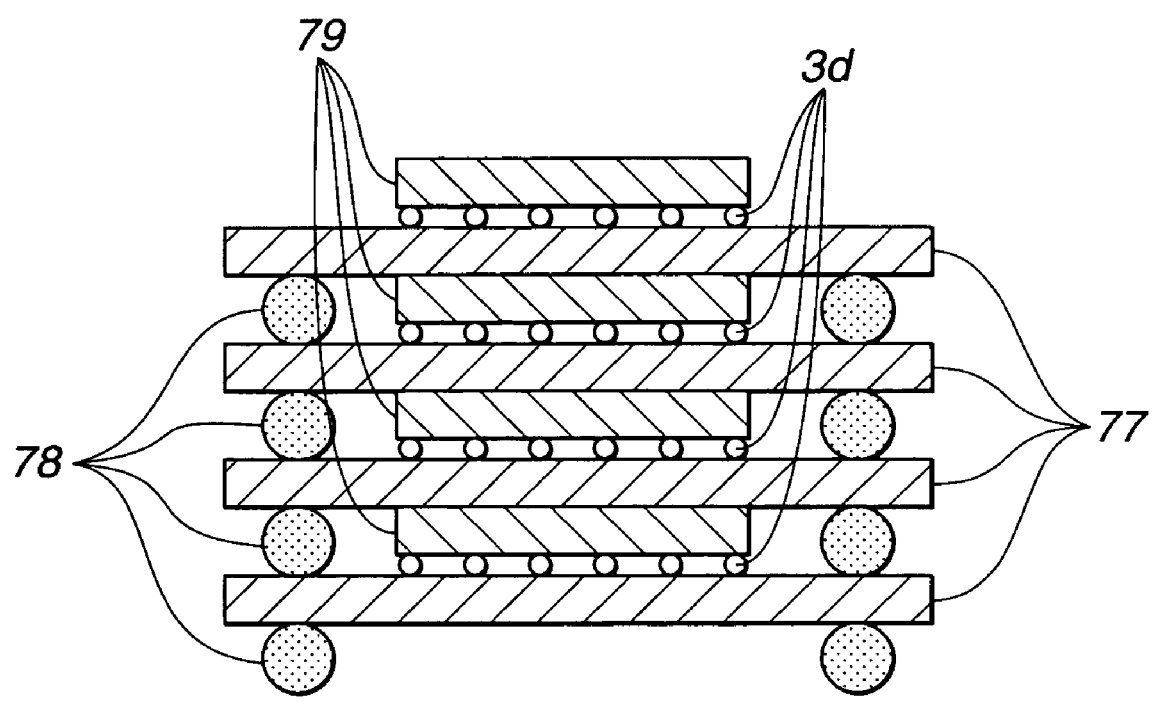
FIG. 13 is a cross-sectional view for explaining a method for mounting a flash memory.

Furthermore, when mounting the flash memory 3d on the board 62, a multilayer board is used which has such a structure that ultra thin boards 77 and solder balls 78 provided between the ultra thin boards 77 are alternately stacked, as shown in FIG. 13. The respective ultra thin boards 77 are supported by the solder balls 78 and thus stacked at a predetermined spacing. When mounting the flash memory 3d, the flash memory 3d is mounted between the ultra thin boards 77 via a flip-chip connecting section 79 by using a flexible mounting technique and the flip-chip technique. In this case, four thin chips are used as the flash memory 3d.

Figure 14:
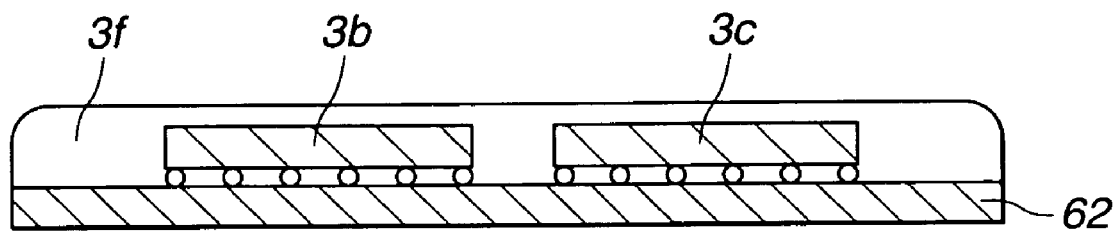
FIG. 14 is a cross-sectional view for explaining the formation of a radio wave absorbent mold in the RF module and the base band processing section.

The RF module 3b and the base band processing section 3c thus mounted are covered by a radio wave absorbent mold 3f, as shown in FIG. 14, in order to prevent radio waves from outside.

In the radio communication device 3, the antenna section 3a, the RF module 3b, the base band processing section 3c, and the flash memory 3d are mounted on the board 62, as described above. Thus, the antenna section 3a, the RF module 3b, the base band processing section 3c, and the flash memory 3d can be sequentially mounted from the other end 60b toward the one end 60a. By using the above-described technique, the antenna section 3a, the RF module 3b, the base band processing section 3c, and the flash memory 3d can be housed within the casing 60 having a thickness of 2.8 μm, a longitudinal dimension of 50.0 mm and a lateral dimension of 2.4 mm.

Figure 15:
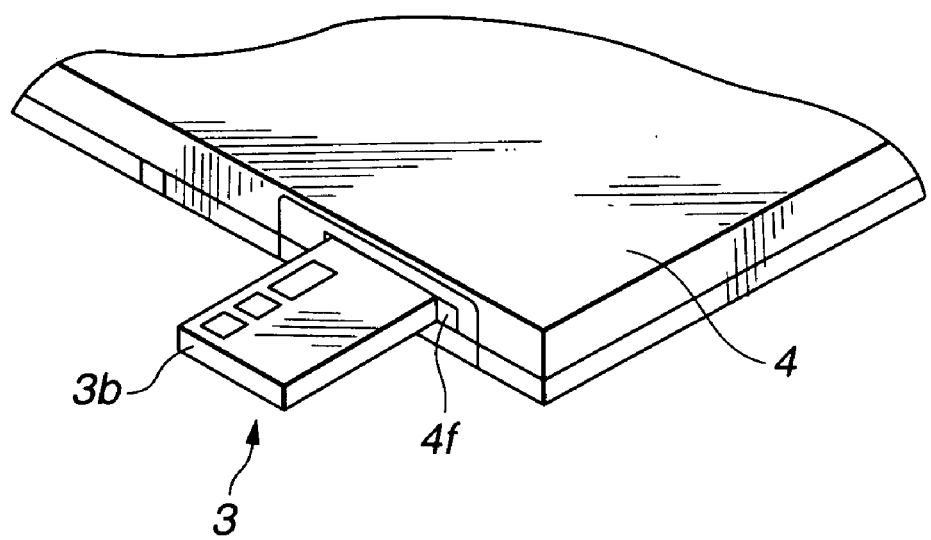
FIG. 15 is a perspective view showing the state where the radio communication device included in the wireless LAN system according to the present invention is mounted on a host equipment.

The radio communication device 3 of such a structure is loaded in the host equipment 4 such as a personal computer, in a mode as shown in FIG. 15. Specifically, when the output terminals 61 provided on the one end 60a of the casing 60 of the radio communication device 3 are connected to a recessed connecting section 4f of the personal computer, the one end 60a is held inside the recessed connecting section 4f of the personal computer and the other end 60b is exposed outside of the personal computer. By thus connecting the radio communication device 3 with the personal computer so as to expose the other end 60b to the outside, at least a part of the casing 60 covering the antenna section 3a is exposed to the outside.

In the case where the radio communication device 3 has the casing 60 of the external structure as shown in FIG. 4, the radio communication device 3 is connected with the personal computer so that the other end 60b having a greater thickness than the one end 60a is exposed outside the personal computer.

The protocol stacks mounted on the portable telephone 2, the radio communication device 3 and the host equipment 4, which constitute the wireless LAN system 1, will now be described with reference to FIG. 2.

The portable telephone 2 has mounted thereon a protocol stack 11 which has a physical layer (PHY), a medium access control layer (MAC) and a logical link control layer (LLC) for realizing the wireless LAN system 1 of the Bluetooth system, as lower three layers. By using the protocols of the lower three layers, the portable telephone 2 carries out transmission/reception of a control packet to/from the radio communication device 3 via the short distance radio communication network 30.

The portable telephone 2 also has mounted thereon a W-CDMA (wide band-code division multiple access) protocol as the upper layer with respect to the lower three layers. As the portable telephone 2 has the W-CDMA protocol mounted thereon and is set in the data communication mode by the radio communication device 3, connection to the public communication network 40 is realized via the mobile communication network 20. The portable telephone 2 may also have mounted thereon a protocol that is different from the W-CDMA protocol.

The radio communication device 3 has a radio transmission/reception function and a protocol control function. The radio communication device 3 carries out transmission/reception of a control packet via the portable telephone 2 and the short distance radio communication network 30, and carries out input/output of data from/to the host equipment 4.

Similar to the portable telephone 2, the radio communication device 3 has mounted thereon a protocol stack 12 which has a physical layer (PHY), a medium access control layer (MAC) and a logical link control layer (LLC) of the Bluetooth system, as lower three layers. By using the protocols of the lower three layers, the radio communication device 3 carries out transmission/reception of data to/from the portable telephone 2 via the short distance radio communication network 30. The structure and processing contents of the radio communication device 3 will be later described further in detail.

The radio communication device 3 also has mounted thereon a PPP (point to point protocol) layer, an IP (Internet protocol) layer and a TCP (transmission control protocol) layer as the upper layers above the lower three layers for constituting the short distance radio communication network 30. The radio communication device 3 executes processing conformable to the PPP so as to carry out dial-up access to the Internet service provider included in the public communication network 40, and executes processing conformable to the IP and TCP so as to control the portable telephone 2 to connect to the WWW (world wide web) server included in the public communication network 40.

Moreover, the radio communication device 3 also has mounted thereon a HOST I/F layer for physical connection with the host equipment 4, as the upper layer above the TCP layer. The HOST I/F layer is a layer for connecting with the host equipment and then carrying out input/output of user data. The HOST I/F layer is a layer for carrying out processing that is to be carried out, for example, by a USB or an existing interface for inputting/outputting only the data stored in the flash memory.

The host equipment 4 has mounted thereon a HOST I/F layer corresponding to the HOST I/F layer mounted on the uppermost layer of the radio communication device 3, and an application (AP) layer as the upper layer with respect to the HOST I/F layer. By having the HOST I/F layer mounted thereon, the host equipment 4 inputs/outputs user data generated by the application (AP) from/to the radio communication device 3. The application layer stored in the host equipment 4 is equivalent to installed application software, if the host equipment 4 is a personal computer.

Also, the host equipment 4 is operated by the user and thus generates an operation input signal. The host equipment 4 generates, for example, an operation input signal to the effect that it is to be connected with the portable telephone 2 via the radio communication device 3 and the short distance radio communication network 30, and outputs a control command accordance to the operation input signal, to the radio communication device 3. Thus, as the portable telephone 2 is connected with the public communication network 40, the host equipment 4 is connected with the public communication network 40 via a public network made up of the short distance radio communication network 30 and the mobile communication network 20.

Moreover, when the radio communication device 3 is loaded in the host equipment 4, the host equipment 4 carries out input/output of a control packet including user data from/to the radio communication device 3 via the HOST I/F layer by using a serial interface.

Figure 16:
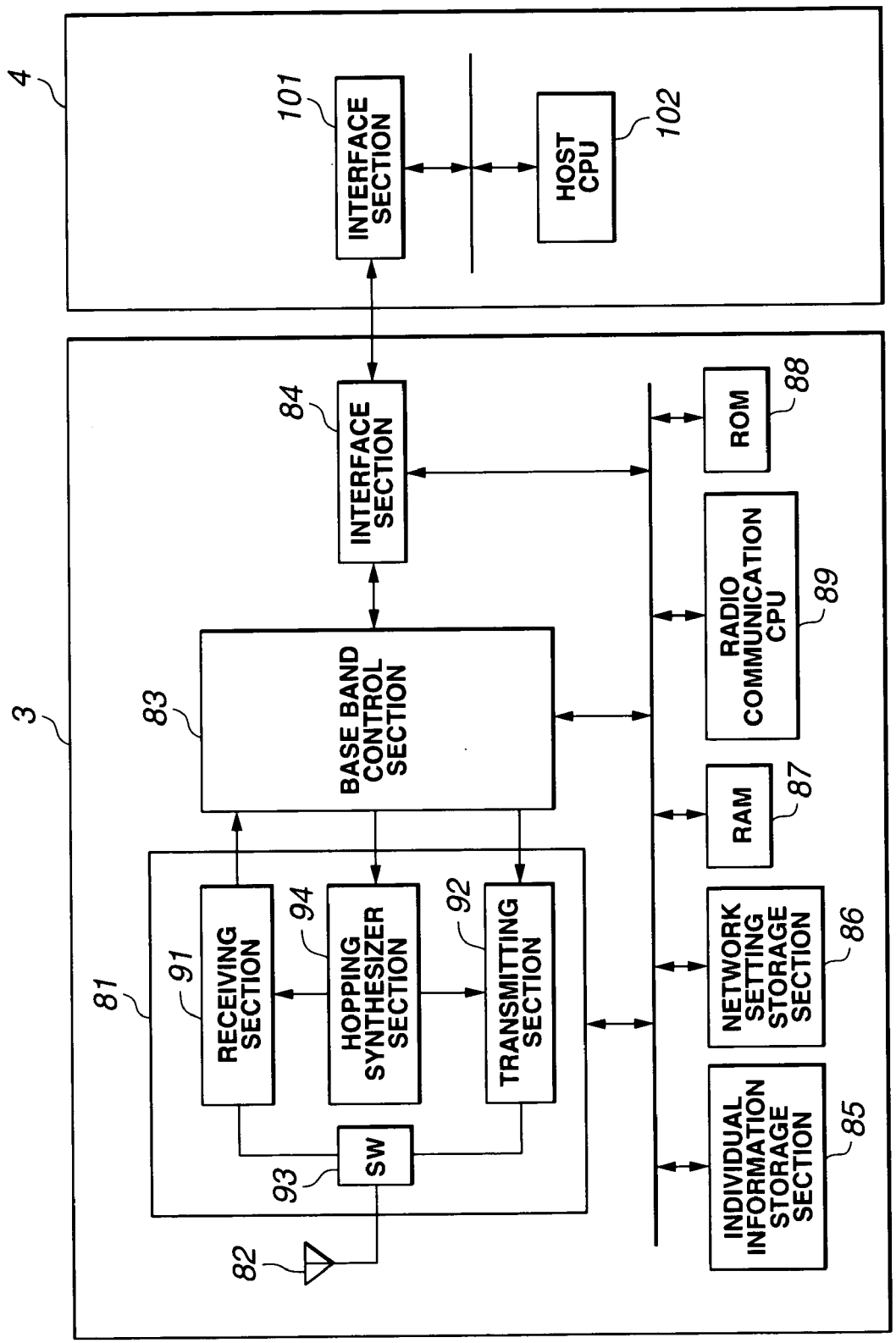
FIG. 16 is a block diagram showing the structure of the radio communication device constituting the wireless LAN system according to the present invention and the host equipment.

FIG. 16 shows a block diagram of the radio communication device 3 and the host equipment 4 constituting the wireless LAN system 1.

The radio communication device 3 has a communication control section 81 for carrying out radio communication in the wireless LAN system 1, an antenna section 82 for transmitting/receiving user data and the like to/from each section constituting the wireless LAN system 1, a base band control section 83 for controlling communication carried out by the communication control section 81, and an interface section 84 for carrying out input/output of a control packet including user data from/to the host equipment 4. In this case, the communication control section 81 corresponds to the above-described RF module 3*b*, and the base band control section 83 corresponds to the above-described base band processing section 3*c*.

The antenna section 82 is made up of an antenna for transmitting/receiving signals in a 2.4-GHz band (2.402 to 2.480 GHz). The antenna section 82 transmits data from the communication control section 81 to the portable telephone 2 via the short distance radio communication network 30, and also receives a signal from the portable telephone 2 via the short distance radio communication network 30 and outputs it to the communication control section 81. The antenna section 82 corresponds to the above-described antenna section 3*a*.

With respect to the data in the short distance radio communication network 30 transmitted/received by the antenna section 82, a control packet which consists of a predetermined number of bits and is made up of user data and control data is transmitted/received as a minimum unit.

The communication control section 81 has a receiving section 91 for carrying out processing to receive a control packet from the antenna section 92, a transmitting section 92 for carrying out processing to transmit a control packet from the antenna section 82, a switch section 93 for switching transmission of a control packet from the transmitting section 92 via the antenna section 82 and output of a control packet from the antenna section 82 to the receiving section 91, and a hopping synthesizer section 94 for carrying out spectrum spreading by frequency hopping with respect to control packets in the receiving section 91 and the transmitting section 92.

The switch section 93 operates in response to a control signal from a radio communication CPU (central processing unit) 89, which will be described later. When receiving a control packet from the antenna section 82, the switch section 93 operates so as to output the control packet from the antenna section 82 to the receiving section 91. When transmitting a control packet from the antenna section 82, the switch section 93 operates so as to output the control packet from the transmitting section 92 to the antenna section 82.

The receiving section 91 receives the control packet from a switch section 93 and outputs it to the base band control section 83. The receiving section 91 has a hopping frequency pattern designated therefor by the hopping synthesizer section 94. Thus, the receiving section 91 receives the control packet in accordance with the frequency pattern of the case of receiving the control packet from the switch section 93 and then outputs the control packet to the base band control section 83. In this case, the receiving section 91 carries out processing to multiply the frequency pattern designated for each packet by the hopping synthesizer section 94, and outputs the resultant control packet to the base band control section 83.

The transmitting section 92 is supplied with a control packet of each packet unit which is generated and primary-modulated by the base band control section 83, and outputs the control packet to the switch section 93, as the control packet to be outputted to the portable telephone 2 via the short distance radio communication network 30 from the antenna section 82. The transmitting section 92 has a frequency pattern designated therefor by the hopping synthesizer section 94 and outputs the control packet to the switch section 93 in accordance with the designated frequency pattern. In this case, the transmitting section 92 carries out processing to perform frequency conversion on each packet unit by using the frequency pattern designated by the hopping synthesizer section 94 and then to transmit the control packet.

The hopping synthesizer section 94 has a hopping pattern designated for frequency hopping from the base band control section 83. When receiving a control packet from the antenna section 82, the hopping synthesizer section 94 outputs the frequency pattern of the hopping pattern designated by the base band control section 83 to the receiving section 91. When transmitting a control packet from the antenna section 82, the hopping synthesizer section 94 outputs to the transmitting section 92 the frequency pattern for the transmitting section 92 to perform frequency conversion on the data from the base band control section 83. The hopping synthesizer section 94 is controlled by the base band control section 83 so as to designate the same frequency pattern as those of the receiving section 91 and the transmitting section 92.

The hopping synthesizer section 94 carries out frequency conversion so as to perform frequency hopping 1600 times per second, for example, on 79 channels obtained by splitting the band every 1 MHZ (2.402 to 2.480 GHz).

The base band control section 83 carries out the following processing in accordance with a control signal from the radio communication CPU 89, which will be described later.

The base band control section 83 is supplied with a control packet of each packet unit from the receiving section 91, and carries out processing to demodulate the control packet which is frequency-modulated by frequency hopping. When transmitting a control packet from the antenna section 82, the base band control section 83 performs primary modulation on the control packet to be transmitted and then outputs the resultant control packet to the transmitting section 92.

Moreover, the base band control section 83 provides a hopping pattern to the hopping synthesizer section 94, thereby controlling the hopping synthesizer section 94. Thus, the base band control section 83 controls the transmission timing for the control packet to be transmitted from the radio communication device 3 and also controls the reception timing for the control packet to be received. The base band control section 83 provides, for example, a frequency pattern f(k), f(k+1), f(k+2), . . . as the hopping pattern to the hopping synthesizer section 94 at every predetermined time.

Furthermore, the base band control section 83 converts a control packet into a predetermined packet format and outputs each control packet as a unit to the receiving section 91. The base band control section 83 also carries out processing to decompose a control packet of the predetermined packet format from the transmitting section 92 and outputs the decomposed control packet to the radio communication CPU 89 via the interface section 84 or the data bus.

Figures 17, 18:
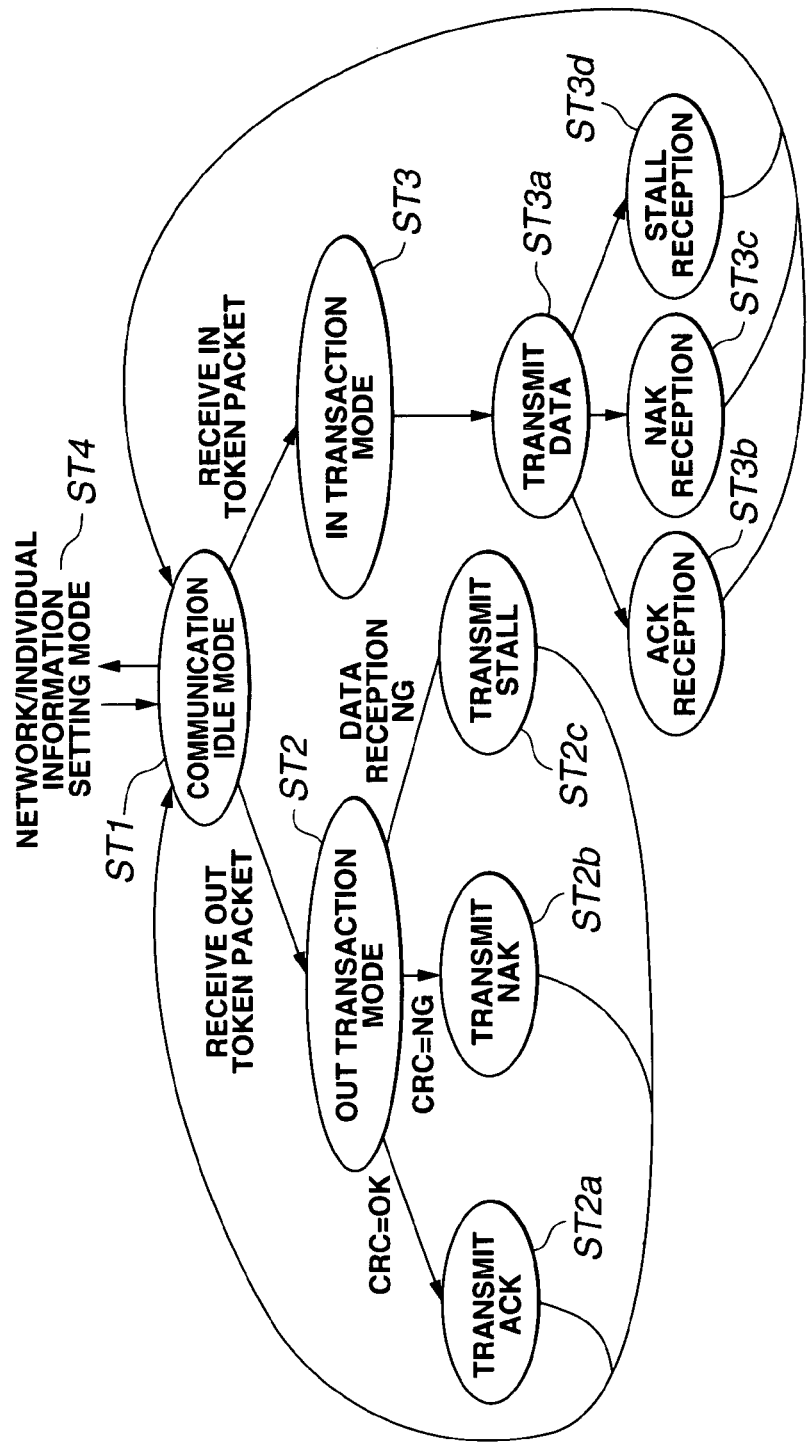
FIG. 17 shows the packet format of a control packet transmitted/received in the wireless LAN system according to the present invention.
FIG. 18 shows the state transition of an operation mode of the radio communication device constituting the wireless LAN system according to the present invention.

The predetermined packet format consists of SYNC (synchronous) data, PID (packet ID) data, PAYLOAD, and CRC (cyclic redundancy code) data, for example, as shown in FIG. 17, and is basically conformable to the bulk transfer system of the USB standard.

The SYNC data is a synchronization code word indicating the start of the packet.

The PID data is an identifier for identifying the packet and therefore data indicating the type of the packet.

The PAYLOAD is an area in which control data and user data are stored.

The CRC data is a CRC parity for detection of an error, provided with respect to the PAYLOAD.

The interface section 84 operates in accordance with a control signal from the radio communication CPU 89. The interface section 84 is supplied with the control packet received from the antenna section 82 via the communication control section 81 and the base band control section 83, then performs predetermined conversion processing on the control packet, and outputs the resultant control packet to the host equipment 4. When transmitting a control packet from the antenna section 82, the interface section 84 outputs the control packet inputted via the host equipment 4 to the base band control section 83.

The interface section 84 may be, for example, a serial interface having the specification similar to that of a memory stick (trademark registered), as shown in FIGS. 5 and 6.

The radio communication device 3 also has an individual information storage section 85 for storing individual information provided for each user, and a network setting storage section 86 for storing network setting information indicating necessary information for connecting the host equipment 4 with networks such as the short distance radio communication network 30 and the public communication network 40.

In the individual information storage section 85, the mail address of the user owning the host equipment 4, the user ID for connecting to an access point, the password (for PPP connection) and the like are stored as individual information. The information in the individual information storage section 85 is read and has its contents controlled by the radio communication CPU 89.

In the case where an electronic mail application is assumed as an application to be executed by the radio communication device 3, the following information may be stored in the individual information storage section 85: information indicating an electronic mail address list (address book) of destinations of electronic mails, information indicating the transmission/reception record, information indicating a fixed text list for realizing simplification of input to the host equipment 4 (for example, a digital camera) which has a poor character input function, signature information to be added at the end of texts of a transmitted electronic mail, information indicating the mail unique ID for carrying out management of mails that are not read and mails that have been read in receiving electronic mails, and the like.

Moreover, SIM (subscriber identification module) information may also be stored in the individual information storage section 85. The SIM information stored in the individual information storage section 85 is information which is required for identifying the user and which is encrypted inside the radio communication device 3 so as to improve the security. The SIM information includes, for example, the user ID, the user password, the mail ID for accessing the mail box of an individual, the mail password, the mail address of the user, the password for individual identification for confirming the right of use of the radio communication device 3 itself and the like, which are encrypted.

In the network setting storage section 86, the server address, the telephone number of an access point or the like, which are required when the host equipment 4 makes dial-up access to the Internet service provider of the public communication network 40, are stored as the network setting information. The network setting information is read and has its contents controlled by the radio communication CPU 89.

The radio communication device 3 also has a RAM (random access memory) 87, ROM (read only memory) 88, and the radio communication CPU 89 which are connected to a data bus.

The radio communication CPU 89 reads a control program for controlling each section constituting the radio communication device 3 from the ROM 88 via the data bus and thus generates a control signal. The radio communication CPU 89 stores data into the RAM 87 as a work space, when necessary, and executes the control program to generate the control signal. Thus, the radio communication CPU 89 controls the base band control section 83, the communication control section 81 and the interface section 84 so as to generate a control packet for controlling communication with another equipment constituting the wireless LAN system 1 and to carry out transmission/reception of the control packet to/from the host equipment 4 via the interface section 84. The contents of processing carried out by execution of the control program by the radio communication CPU 89 will be later described in detail.

The host equipment 4 has an interface section 101 for carrying out input/output of data from/to the interface section 84 of the radio communication device 3, and a host CPU 102 for controlling the interface section 101 or the like via a data bus.

The interface section 101 is made up of a serial interface such as USB capable of carrying out input/output of a control packet including user data with the interface section 84 of the radio communication device 3.

The interface section 101 may also be a serial interface capable of carrying out transmission/reception of a control packet to/from the interface section 84 of the radio communication device 3, as shown in FIGS. 5 and 6.

The host CPU 102 generates a control packet including user data generated by the host equipment 4 and control data such as an operation input signal or the like generated by operation by the user. The host CPU 102 executes the processing in the application layer, thereby generating the user data and the control data. The host CPU 102 executes the processing in the HOST I/F layer, thereby generating a control packet, and outputs the control packet to the radio communication device 3 via the interface section 101.

The radio communication device 3 and the host equipment 4 are in a master-slave relation. The host equipment 4 is a master and the radio communication device is a slave. That is, the radio communication device 3 operates in accordance with a control packet or the like from the host CPU 102. For example, in the case of outputting the user data from the radio communication device 3 to the host equipment 4, the radio communication device 3 can output the user data to the host equipment 4 only when a control packet to the effect that the right to use the serial data line for connecting to the host equipment 4 is inputted to the radio communication CPU 89 from the host CPU 102.

More specifically, when transmitting/receiving the user data between the radio communication device 3 and the host equipment 4, a control packet of the packet format shown in FIG. 17 is outputted from the host equipment 4 to the radio communication CPU 89 of the radio communication device 3 at a predetermined time interval.

That is, when transmitting the user data to the radio communication device 3, the host CPU 102 of the host equipment 4 generates a control packet in which control data indicating "OUT token packet" as the PID data is stored, and outputs the control packet to the radio communication CPU 89. When the host CPU 102 can accept the user data from the radio communication device 3, the host CPU 102 generates a control packet in which control data indicating "IN token packet" as the PID data is stored, and outputs the control packet to the radio communication CPU 89. Thus, control packets including user data can be bidirectionally inputted/outputted between the radio communication device 3 and the host equipment 4.

Moreover, the host CPU 102 generates and outputs a control packet in which the contents of the PID data are changed in accordance with the control contents of the radio communication device 3, thereby controlling the operation mode of the radio communication device 3. Specifically, the host CPU 102 outputs the control packet to the radio communication CPU 89, thus switching the mode of the radio communication device 3 to a communication idle mode, a memory mode, an OUT transaction mode, or an IN transaction mode.

FIG. 18 shows a state transition view of the radio communication device 3 with its operation mode switched by the host CPU 102.

In this case, the radio communication device 3 is normally set in the communication idle mode (step ST1), that is, an operation mode in which a control packet is not transmitted from the host equipment 4 to the radio communication device 3 and in which the radio communication device 3 is on standby for communication processing.

When a control packet in which control data indicating "OUT token packet" as PID data is stored is inputted to the radio communication CPU 89 from the host CPU 102, the radio communication CPU 89 shifts to the OUT transaction mode (step ST2), that is, an operation mode in which user data is transmitted from the host equipment 4.

In the OUT transaction mode, when it is determined from the CRC data of the control packet that no error is included in the PAYLOAD, the radio communication CPU 89 generates a control packet in which control data indicating a "ACK (acknowledgment)" as PID data is stored, and transmits the control packet to the host equipment 4 (step ST2a). Then, the radio communication CPU 89 returns to the communication idle mode (step ST 1).

In the OUT transaction mode, when it is determined from the CRC data of the control packet that an error is included in the PAYLOAD, the radio communication CPU 89 generates a control packet in which control data indicating "NAK (negative acknowledgment)" as PID data is stored, and transmits the control packet to the host equipment 4 (step ST2b). Then, the radio communication CPU 89 returns to the communication idle mode (step ST1).

Moreover, in the OUT transaction mode, when the radio communication CPU 89 cannot receive the control packet, the radio communication CPU 89 generates a control packet in which control data indicating "STALL" as PID data is stored, and transmits the control packet to the host equipment 4 (step ST2c). Then, the radio communication CPU 89 returns to the communication idle mode (step ST1).

When a control packet in which control data indicating "IN token packet" as PID data is housed is inputted to the radio communication CPU 89 from the host CPU 102, the radio communication CPU 89 shifts from the communication idle mode (step ST1) to the IN transaction mode (step ST3), that is, an operation mode in which transmission of user data from the host equipment 4 to the radio communication device 3 is permitted.

In the IN transaction mode (step ST3), the radio communication CPU 89 generates a control packet including user data and carries out transmission of the user data (step ST3a). In this case, the radio communication CPU 89 stores, into each control packet, control data having PID data sequentially changed to "DATA0" and "DATA1" as toggle, and transmits the control packet to the host CPU 102. Thus, the radio communication CPU 89 and the host CPU 102 mutually confirm transmission of the control packet to be inputted/outputted.

In response to the transmission (step ST3a) of the control packet to the host equipment 4, the radio communication CPU 89 is set in the standby state until a control packet indicating a response from the host CPU 102 is transmitted. The response to be transmitted from the host CPU 102 to the radio communication CPU 89 is ACK reception (step ST3b) indicating that the data is securely transmitted from the radio communication device 3 to the host equipment 4, NAK reception (step ST3c) indicating that the data is not transmitted from the radio communication device 3 to the host equipment 4, or STALL reception (step ST3d) indicating that the host equipment 4 is not in the state for receiving the data.

The radio communication CPU 89 shifts to the communication idle mode (step ST 1) in response to the reception of a control packet having control data indicating ACK reception, NAK reception or STALL reception stored in the PAYLOAD.

When a control packet in which control data indicating "network/individual information setting mode" as PID data is stored is inputted to the radio communication CPU 89 from the host CPU 102, the radio communication CPU 89 shifts from the communication idle mode (step ST1) to a network/individual information setting mode (step ST4).

In the network/individual information setting mode, the radio communication CPU 89 carries out processing such as reading, writing, updating, erasing or the like of the individual information stored in the individual information storage section 85 and the network setting information stored in the network setting storage section 86, and then returns to the communication idle mode (step ST1). In this case, the radio communication CPU 89 carries out processing such as reading, writing, updating, erasing or the like of the individual information and the network setting information, for example, in accordance with the control data stored in the PAYLOAD.

When connecting the radio communication device 3 to the public communication network 40 via the short distance radio communication network 30, the host CPU 102 transmits a control packet to that effect to the radio communication CPU 89, thus controlling the connection with the Internet service provide in the public communication network 40. The processing procedure for connecting host equipment 4 with the public communication network 40 via the radio communication device 3, the short distance radio communication network 30 and the mobile communication network 20 will be described later.

Figure 19:
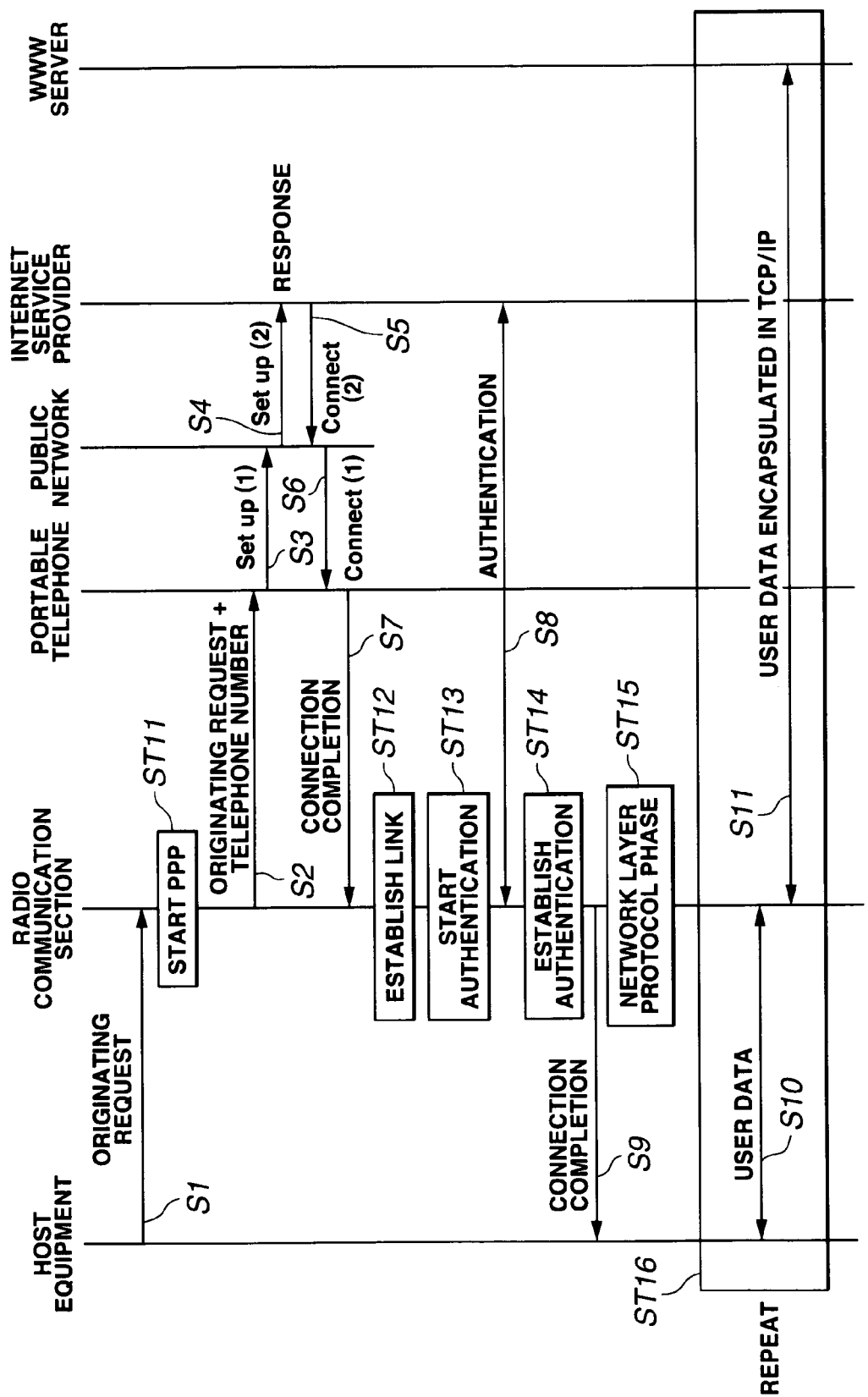
FIG. 19 is a flowchart for explaining an example of processing procedure of the radio communication device in connecting the host equipment to the Internet.

Hereinafter, the processing to be carried out by the radio communication CPU 89 for connecting the host equipment 4 with the WWW server in the public communication network 40 in the above-described wireless LAN system 1 will be described with reference to the flowchart of FIG. 19. FIG. 19 shows the data transmitted/received among the host equipment 4, the radio communication device 3, the portable telephone 2, the public network comprising the mobile communication network 20 and the public communication network 40, the Internet service provider included in the public communication network 40, and the WWW server included in the public communication network 40, and mainly shows the processing contents of the radio communication CPU 89.

In FIG. 19, first, the host CPU 102 transmits a control packet indicating an originating request S1 for originating user data from the host equipment 4 to the WWW server included in the public communication network 40, to the radio communication CPU 89.

Then, in response to the originating request S1, the radio communication CPU 89 starts the PPP stored in the ROM 88, at step ST11.

The radio communication CPU 89 carries out processing to generate a control packet having the originating request and telephone number S2 stored in PAYLOAD, with reference to the telephone number of the Internet service provider of the access destination stored in the network setting storage section 86, and transmits the originating request and telephone number S2 to the portable telephone 2 via the short distance radio communication network 30.

Then, in response to the originating request and telephone number S2 from the radio communication device 3, the portable telephone 2 transmits first call setting S3 (Set up (1)) to the public network. In response to this, the public network transmits second call setting S4 (Set up (2)) having the contents similar those of the first call setting S3 to the Internet service provider via a plurality of repeaters such as routers. As the Internet service provider responds, the public network is supplied with and receives first connection information S5 (Connect (2)) for confirming connection, from the Internet service provider. Then, in response to the reception of the first connection information S5, the public network transmits second connection information S6 (Connect (1)) having the contents similar to those of the first connection information S5 to the portable telephone 2.

The portable telephone 2 transmits connection completion information S7 indicating that the connection with the Internet service provider is completed, to the radio communication device 3 via the short distance radio communication network 30.

At the next step ST12, the radio communication CPU 89 shifts to a link establishment phase as the PPP in response to the connection completion information S7 received from the portable telephone 2.

At the next step ST13, the radio communication CPU 89 carries out authentication processing with the PPP. In this case, the radio communication CPU 89 reads out the user ID and password from the individual information storage section 85 and transmits/receives authentication information S8 for mutually authentication with the Internet service provider via the portable telephone 2 and the public network by using the PPP, thus carrying out the authentication processing.

At the next step ST14, the radio communication CPU 89 completes the authentication processing by transmitting/receiving the authentication information S8 to/from the Internet service provider, and then enters an authentication establishment phase. The radio communication CPU 89 outputs a control packet including connection completion information S9 indicating that the connection between the radio communication device 3 and the Internet service provider is completed, to the host CPU 102 of the host equipment 4.

At the next step ST15, the radio communication CPU 89 shifts to a network layer protocol phase in response to the completion of the authentication processing of step ST14. Specifically, the radio communication CPU 89 executes processing in conformity with the IP and TCP mounted in the protocol stack, thereby making connection with the public communication network 40.

At the next step ST16, the host CPU 102 stores user data into PAYLOAD of the control packet and carries out input/output of user data S10 with the radio communication device 3. Also, the host CPU 102 packetizes the user data S10 by adding control information to the user data S10 in accordance with the TCP and IP, and carries out transmission/reception of packetized user data S11 between the radio communication device 3 and the WWW server in the public communication network 40.

With the radio communication device 3 which carries out the above-described processing, since it has the individual information storage section 85 and the network setting storage section 86 in which the individual information and the network setting information are stored, respectively, connection with the Internet service provider can be made by starting the PPP by the radio communication CPU 89 and then using the individual information and the network setting information. Also, with the radio communication device 3, connection between the host equipment 4 and the WWW server can be made by starting the IP and TCP, then transmitting/receiving the encapsulated user data to/from the WWW server using the individual information and the network setting information, and connecting to the host equipment 4 using the control packet.

Thus, with the radio communication device 3, since it is not necessary to store the individual information and the network setting information in the host equipment 4, it is not necessary to carry out various types of setting for each host equipment 4 for connection with the public communication network 40, and the network setting or the like for connecting to the public communication network 40 can be simplified for each host equipment 4. Therefore, in the wireless LAN system 1, the connection setting between each host equipment 4 and the WWW server can be carried out by loading the radio communication device 3 in each host equipment 4.

Also, with the radio communication device 3, transmission/reception of data between the host equipment 4 and the public communication network 40 can be carried out irrespective of the type of the host equipment 4, by transmitting/receiving a control packet of the common packet structure for the respective host equipments 4 to/from the individual information storage section 85 and the network setting storage section 86.

Moreover, with the radio communication device 3, in carrying out transmission/reception of data between the host equipment 4 and the public communication network 40, the individual information and the network setting information can be shared by the respective host equipments 4 by performing single-element management of the address information of the server or the like included in the public communication network 40 and the transmission/reception record, irrespective of the type of the host equipment 4, and the trouble of setting the individual information and the network setting information for each host equipment 4 can be eliminated.

Figure 20:
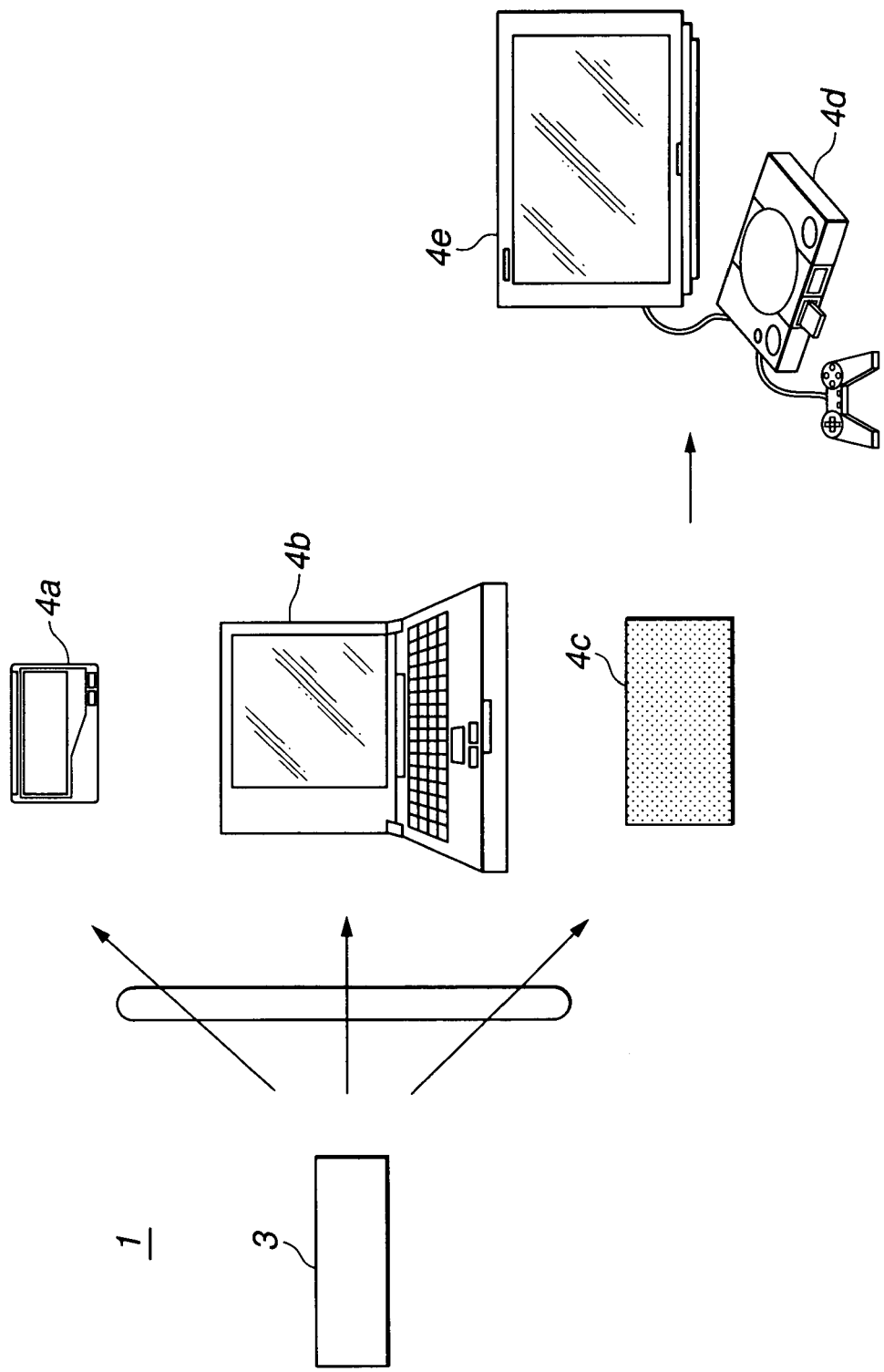
FIG. 20 is a view for explaining the connection between each host equipment and a WWW server by mounting the radio communication device on each host equipment, in the wireless LAN system in which a portable information terminal or the like exists as the host equipment.

As shown in FIG. 20, in the wireless LAN system 1 where a portable information terminal 4a, a personal computer 4b, a conversion adapter 4c, a gate machine 4d and a television 4e exist as the host equipment 4, for example, as the radio communication device 3 is loaded in the host equipment 4c, the radio communication device 3 can connect the game machine 4d, which is not capable of loading the radio communication device 3 therein, with the WWW server.

In such a wireless LAN system 1, when carrying out setting for connecting an equipment having poor operation and display capability such as a digital camera with the WWW server, it is not necessary to carry out various types of setting in the digital camera. By using the portable information terminal 4a or the personal computer 4b having a more advanced man-machine interface than that of the digital camera, the individual information and the network setting information stored in the radio communication device 3 can be set. Thus, with the wireless LAN system 1 having the radio communication device 3, connection between the digital camera and the WWW server can be made by loading the radio communication device 3 which has carried out network setting in the personal computer 4b, into the digital camera, and the network setting can be easily carried out for the digital camera or the like having poor operation and display functions.

Moreover, a user who does not have the personal computer 4b may combine the game machine 4d with the television 4e and set the individual information and the network setting information via the conversion adapter 4c. Since the radio communication device 3 and the game machine 4d cannot carry out input/output of signals directly with each other, input/output of signals between the radio communication device 3 and the game machine 4d is carried out by using a USB or the conversion adapter 4c between the interface of a radio communication device with a memory function, which will be described later, and the interface of the game machine 4d. Thus, the network setting or the like can be easily carried out. By loading the radio communication device 3 which has carried out the network setting in another host equipment 4 such as game equipment 4d or the television 4e into the digital camera, connection between the digital camera and the WWW server is made possible and the digital camera can be used, for example, as a dynamic image viewer.

With the above-described radio communication device 3, it is not necessary to provide a function for constructing the wireless LAN system 1 on the side of the host equipment 4 and a function for connecting to the public communication network 40, as built-in functions, and the cost of the host equipment 4 can be reduced.

The host CPU 102 is not limited to the example in which it starts the PPP, IP and TCP mounted in the radio communication device 3 and controls connection to the Internet. It is also possible to mount the PPP, IP and TCP inside the host equipment 4 and select connection to the Internet using the protocols mounted in the radio communication device 3 or connection to the Internet using the protocols mounted in the host equipment 4.

Figure 21:
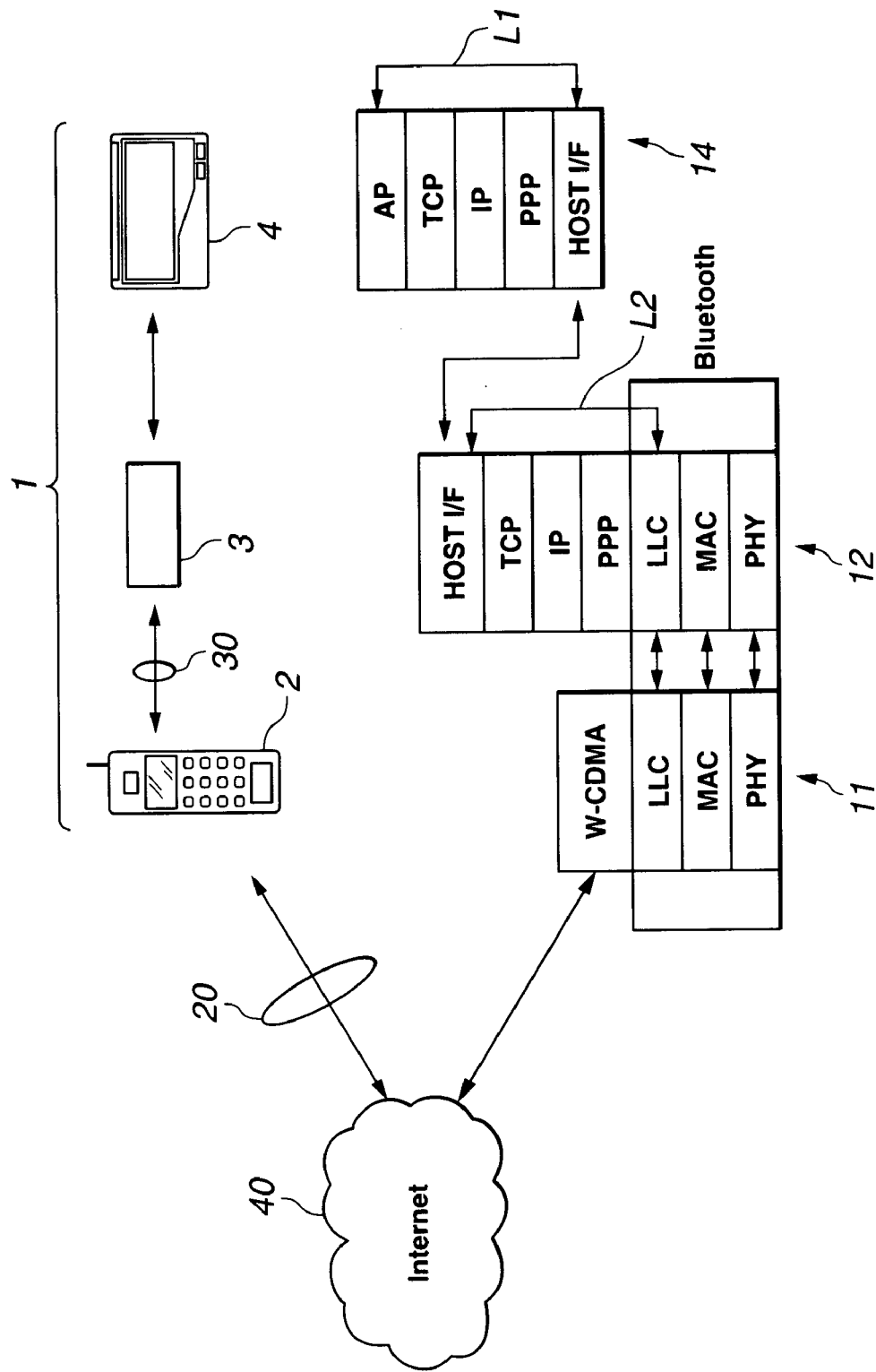
FIG. 21 shows another structure of the wireless LAN system according to the present invention and protocol stacks for respective equipments constituting the wireless LAN system.

Specifically, unlike the example of the wireless LAN system 1 shown in FIG. 2, the PPP, IP and TCP for carrying out network setting may be provided in the protocol stack 14 mounted in the host equipment 4, as shown in FIG. 21.

In the case of making connection with the public communication network 40 by using the wireless LAN system 1 having such a host equipment 4, when the PPP, IP and TCP stored in the host equipment 4 are used, the PPP, IP and TCP mounted in the radio communication device 3 are not started and a path L1 for inputting/outputting a control packet between the HOST I/F layer and the LLC layer in the radio communication device 3 is used. Thus, in the radio communication device 3, a memory space which would be required for starting the PPP, IP and TCP can be used for storing other data. On the other hand, when the PPP, IP and TCP stored in the radio communication device 3 are used, the PPP, IP and TCP mounted in the host equipment 4 are not used and a path L2 for inputting/outputting a control packet between the AP layer and the HOST I/F layer in the host equipment 4 is used.

Alternative processing procedure for connecting the host equipment 4 with the WWW server in the public communication network 40 in the wireless LAN system 1 shown in FIG. 21 will now be described with reference to FIGS. 22 and 23. In the following description of FIGS. 22 and 23, the processing similar the processing shown in FIG. 19 is denoted by the same numeral and will not be described further in detail.

Figure 22:
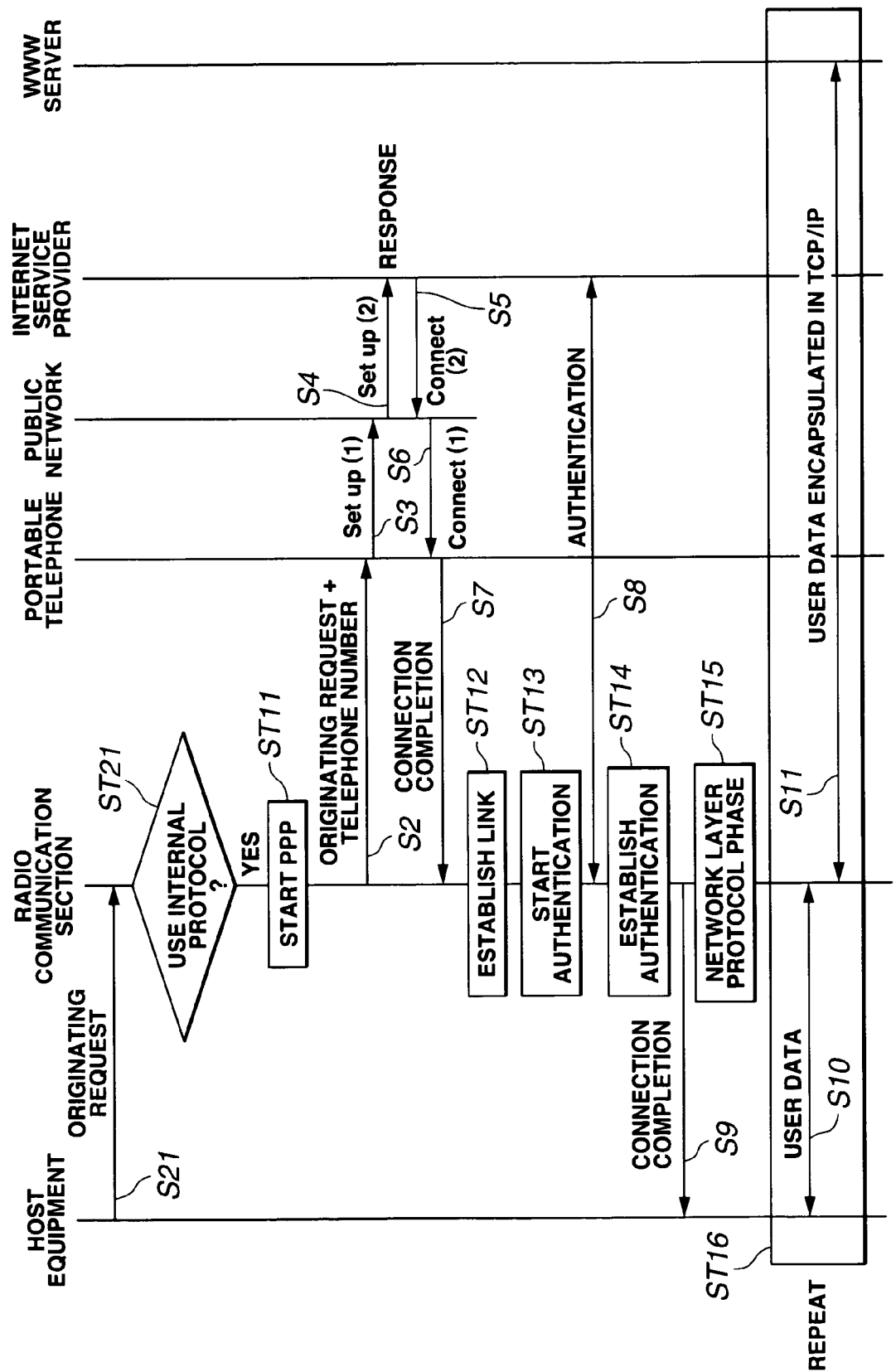
FIG. 22 is a flowchart for explaining another example of processing procedure of the radio communication device in connecting the host equipment to the Internet.

In FIG. 22, first, an originating request S21 for requesting connection between the host equipment 4 and the WWW server in the public communication network 40 is outputted from the host CPU 102 to the radio communication device 3.

At the next step ST21, when only the originating request S21 is transmitted to the radio communication CPU 89 of the radio communication device 3, the radio communication CPU 89 determines to use an internal protocol stored, for example, in the ROM 88 and mounted inside. Then, the radio communication CPU 89 carries out processing of steps ST11 to ST16 similarly to the processing described with reference to FIG. 19, thereby connecting to the Internet service provider in the public communication network 40 and making connection between the host equipment 4 and the WWW server. That is, the radio communication CPU 89 carries out processing of each layer of the protocol stack 14 with respect to a control packet by using the path L1.

Figure 23:
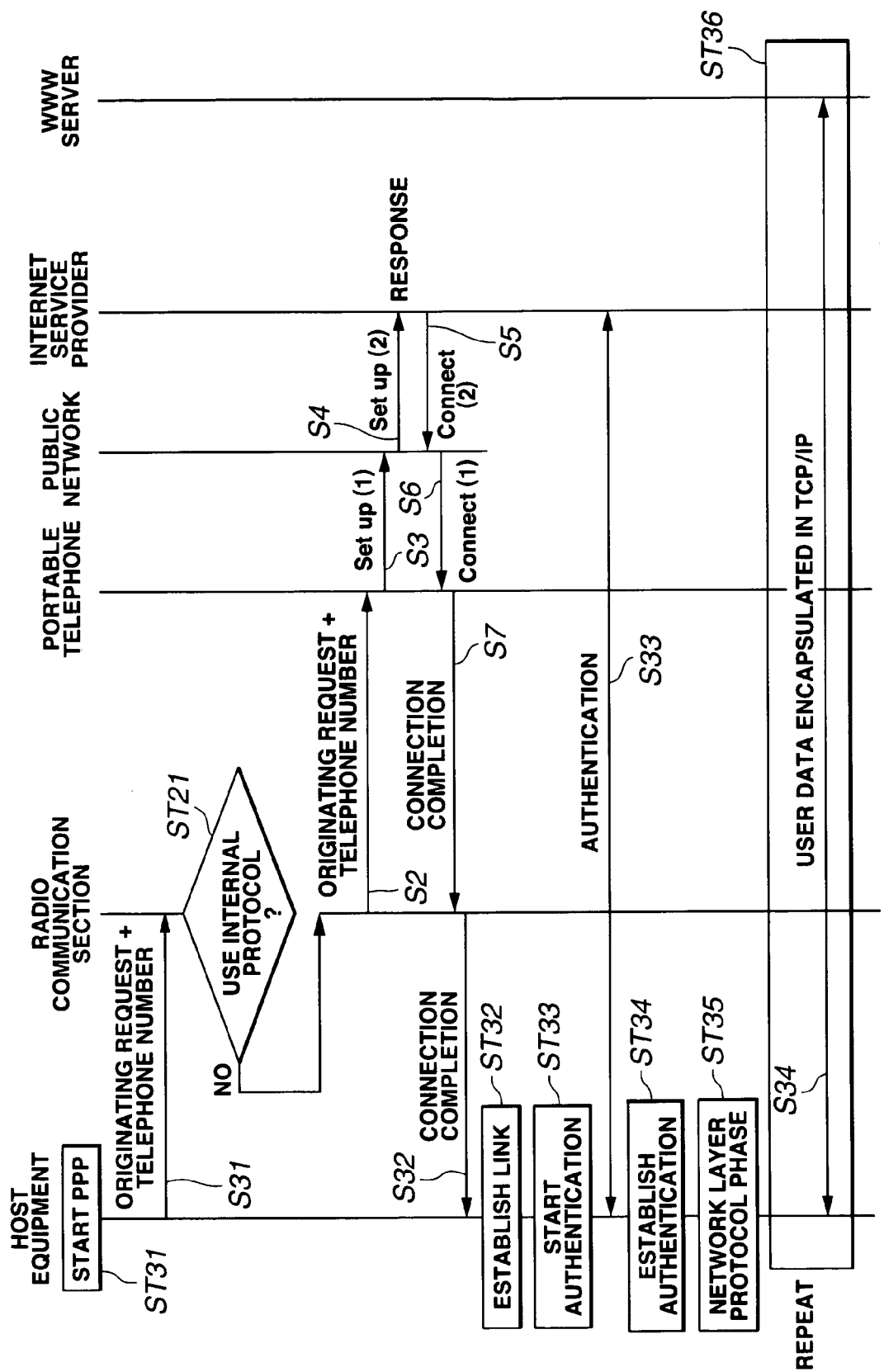
FIG. 23 is a flowchart for explaining another example of processing procedure of the radio communication device in connecting the host equipment to the Internet.

On the other hand, as shown in FIG. 23, if processing to start the PPP as an internal protocol stored in the built-in ROM is carried out by the host CPU 102 at step ST31, and an originating request and telephone number of the Internet service provider S31 is inputted, the radio communication CPU 89 determines not to use the internal protocol at step ST21. That is, the radio communication CPU 89 carries out processing of each layer of the protocol stack 12 with respect to a control packet by using the path L2.

The host equipment 4 causes the portable telephone 2 to transmit an originating request and telephone number S2 having the same contents as those of the originating request and telephone number S31 to the radio communication device 3 via the short distance radio communication network 30, as described above with reference to FIG. 19, and then carries out the following processing.

That is, the host equipment 4 transmits first call setting S3 (Set up (1)) to the public network and transmits second call setting S4 of the same contents as those of the first call setting S3 from the public network to the Internet service provider. In this case, as the Internet service provider responds, the public network is supplied with and receives first connection information S5 for confirming the connection from the Internet service provider. In response to the reception of the first connection information S5, second connection information S6 of the same contents as those of the first connection information S5 is transmitted from the public network to the portable telephone 2, and connection completion information S7 indicating that the connection with the Internet service provider is completed is transmitted from the portable telephone 2 to the radio communication device 3 via the short distance radio communication network 30. The radio communication device 3 outputs connection completion information S32 of the same contents as those of the connection completion information S7, as a control packet, to the host equipment 4.

At the next step ST32, the host CPU 102 shifts to a link establishment phase as the PPP in response to the connection completion information S32 received from the portable telephone 2.

At the next step ST33, the host CPU 102 carries out authentication processing with the PPP. In this case, the host CPU 102 is supplied with the user ID and password as a control packet from the individual information storage section 85 of the radio communication device 3 via the interface section 84 and the interface section 101, and transmits/receives authentication information S33 for mutual authentication with the Internet service provider via the radio communication device 3, the portable telephone 2 and the public network in accordance with the PPP, thus carrying out the authentication processing.

At the next step ST34, the host CPU 102 completes the authentication processing by transmitting/receiving the authentication information to/from the Internet service provider, and then enters an authentication establishment phase.

At the next step ST35, the host CPU 102 shifts to a network layer protocol phase in response to the completion of the authentication processing at step ST34. That is, the host CPU 102 makes connection with the public communication network 40 by using the IP and TCP mounted in the protocol stack.

At the next step ST36, the host CPU 102 packetizes the user data by adding control data to the user data in accordance with the TCP and IP and carries out transmission/reception of packetized user data S34 to/from the WWW server in the public network communication 40 via the radio communication device 3.

Therefore, with the wireless LAN system 1 capable of carrying out such processing, even in the case of connecting to the public communication network 40 using the host equipment 4 on the basis of the determination to use the internal protocol stored in the host equipment 4 at step ST21 in FIG. 23, the individual information and the network setting information are inputted to the host CPU 102 from the individual information storage section 85 and the network setting storage section 86 of the radio communication device 3 via the interface section 84 and the interface section 101. Thus, it is not necessary to store the individual information and the network setting information on the side of the host equipment 4 and to carry out setting for each host equipment 4 for connection to the public communication network 40, and the network setting or the like for connection to the public communication network 40 can be easily carried out for each host equipment 4.

Figure 24:
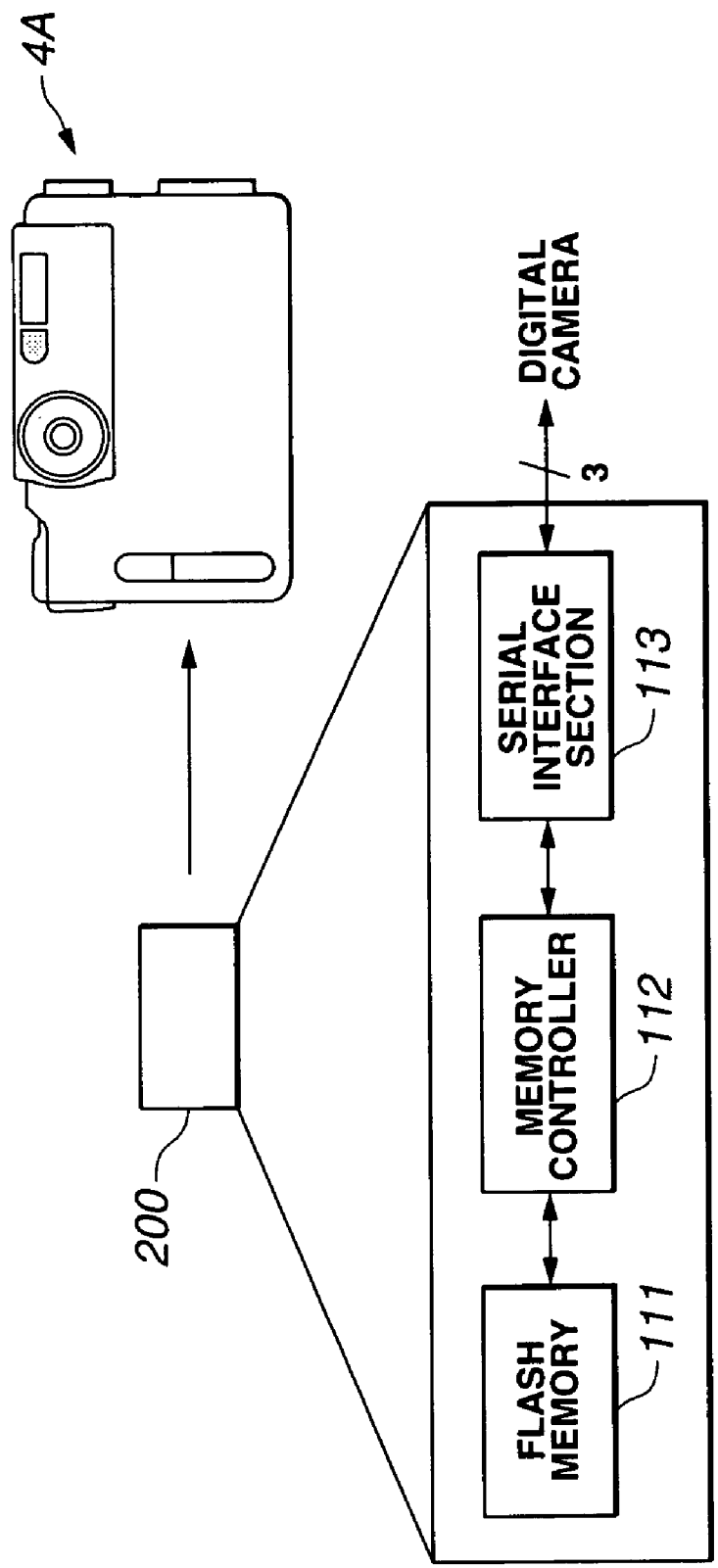
FIG. 24 is a block diagram showing the structure of a radio communication device with a memory function according to the present invention.

A radio communication device with a memory function 200 having a flash memory as shown in FIG. 7 will now be described. The radio communication device with a memory function 200 is used for carrying out input/output of serial data with a digital camera 4A as the host equipment 4, as shown in FIG. 24.

The radio communication device with a memory function 200 has a flash memory 111 for storing image data obtained by shooting with the digital camera 4A, a memory controller 112 for managing the contents of the flash memory 111, and an interface section 113 connected with the digital camera 4A for carrying out input/output of image data or the like. The interface section 113 is a serial interface constituted as shown in FIGS. 5 and 6 and having the same specification as a memory stick (trademark). That is, the radio communication device with a memory function 200 has a plurality of terminals at which the bus state indicating the state of a serial bus when it is connected with an external equipment, data, clock and the like are inputted/outputted.

More specifically, the radio communication device with a memory function 200 may have the same shape and specification as an existing memory card having a built-in flash memory and employing a serial protocol as the interface. That is, the radio communication device with a memory function 200 has, for example, a casing with a longitudinal dimension of 50.0 mm, a lateral dimension of 2.5 $\mu$m and a thickness of 2.8 mm, having the flash memory and the memory controller 112 housed therein. In the radio communication device with a memory function 200, transmission/reception of data to/from the host equipment 4 is carried out by using only the three pins for the data, clock and bus state, of 10 pins. The clock and bus state are supplied from the host equipment 4, and the data is transferred by bidirectional half-duplex transfer. When transmitting/receiving a control packet as data between the radio communication device with a memory function 200 and the host equipment 4, the maximum frequency of the clock is set at 20 MHZ and an error check code with 512 bytes as a basic unit is added, thus carrying out transfer.

The memory controller 112 carries out processing in accordance with the protocol of the serial interface and controls the contents of the flash memory 111. In the case where the flash memory 111 is made up of a plurality of flash memories, the memory controller 112 controls the contents of each flash memory. Moreover, in the case where the flash memory 111 is made up of a plurality of flash memories of different types, the memory controller 112 absorbs the characteristic difference of the various flash memories so as to control each flash memory, and carries out error correction processing corresponding to the error characteristics of the various flash memories. The memory controller 112 also carries out processing to convert parallel data into serial data.

By carrying out processing in conformity with the protocol of the serial interface, the memory controller 112 is compatible with an existing flash memory and even with a future flash memory.

The memory controller 112 employs a FAT (file allocation table), for example, mounted on a personal computer, as the file management system for the flash memory 111.

Moreover, the memory controller 112 stores a plurality of applications such as static images, dynamic images, speech, music and the like into the flash memory 111, and controls the contents of the flash memory 111. In this case, the memory controller 112 prescribes, in advance, the file format and directory management for recording data into the flash memory 111 by each application, and manages the data stored in the flash memory 111. The memory controller 112 employs the DCF (Design rule for Camera File system) standardized by Japan Electronic Industry Development Association (JEIDA), as a static image format, and employs the ADPCM (Adaptive Differential Pulse Code Modulation) of the ITU-T (International Telecommunication Union) Recommendation G.726, as an audio format.

Such a radio communication device with a memory function 200 is loaded into the digital camera 4A at the time of image shooting with the digital camera 4A, and image data obtained by shooting is inputted to the memory controller 112 via the interface section 113. Then, the memory controller 112 carries out processing to store the inputted image data into the flash memory 111. The radio communication device with a memory function 200 is also loaded, for example, via the interface of a personal computer, and outputs the image data stored into the flash memory 111 by memory controller 112 via the interface section 113.

Figure 25:
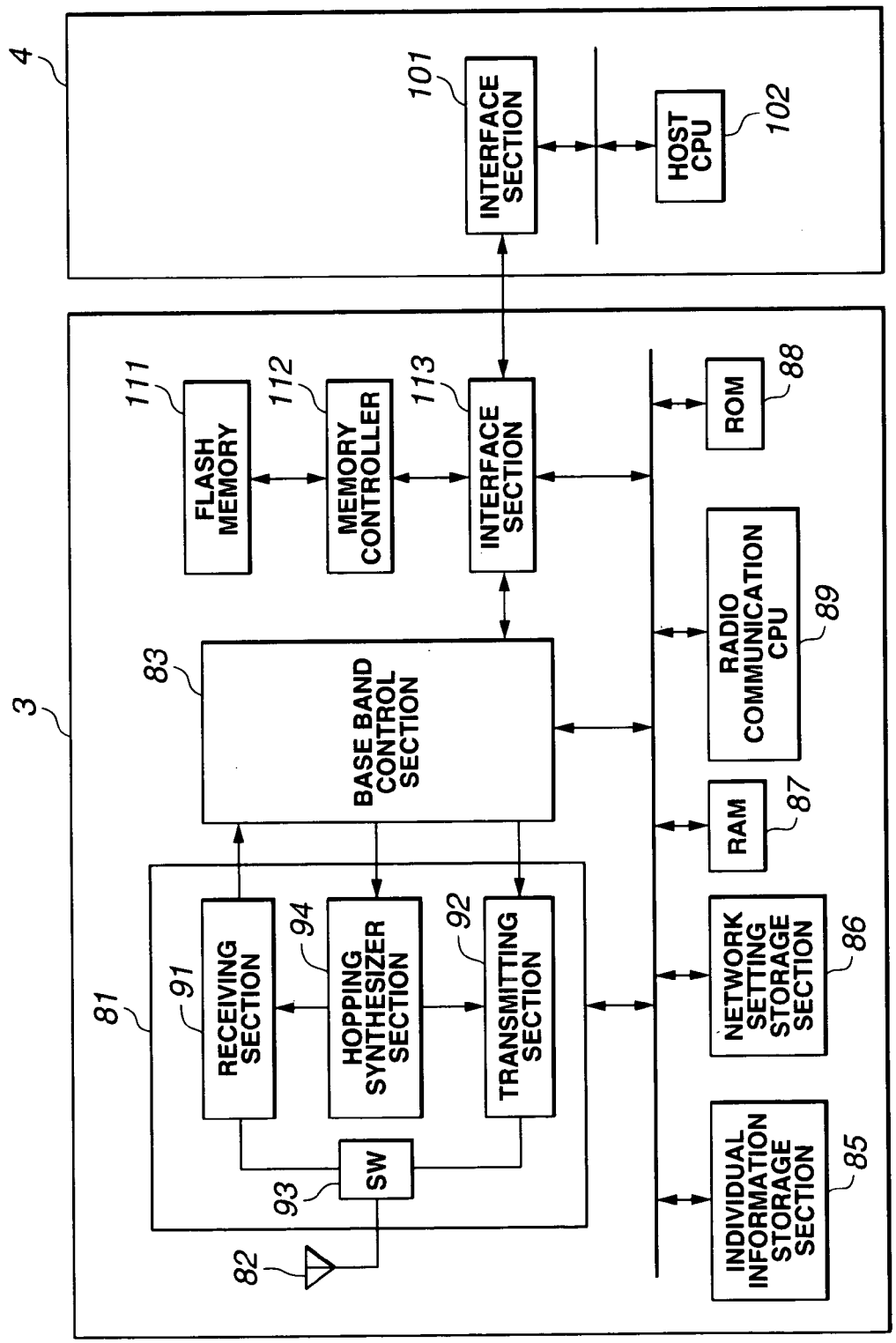
FIG. 25 is a block diagram showing the structure of the radio communication device with a memory function according to the present invention and a host equipment.

The structure of the radio communication device with a memory function 200 is as shown in FIG. 25. In the description of FIG. 25, portions similar to those of the radio communication device 3 shown in FIG. 16 are denoted by the same numerals and will not be described further in detail.

As shown in FIG. 25, the interface section 113 of the radio communication device with a memory function 200 carries out input/output of a control packet and the like from/to the interface section 101 of the host equipment 4, and is connected with a data bus and a base band control section 83. The interface section 101 of the host equipment 4 is an interface corresponding to the interface section 113 of the radio communication device with a memory function 200.

In such a radio communication device with a memory function 200, the individual information and the network setting information included in a control packet are inputted from or outputted to the host equipment 4 by the interface section 113 for inputting/outputting image data.

With the radio communication device with a memory function 200, for example, connection with the digital camera 4A is made and image data obtained by shooting with the digital camera 4A is temporarily stored into the internal flash memory 111. Then, connection with the public communication network 40 via the portable telephone 2 is made by the radio communication CPU 89 and the image data can be transmitted as user data to an individual area of the WWW server.

Figure 26:
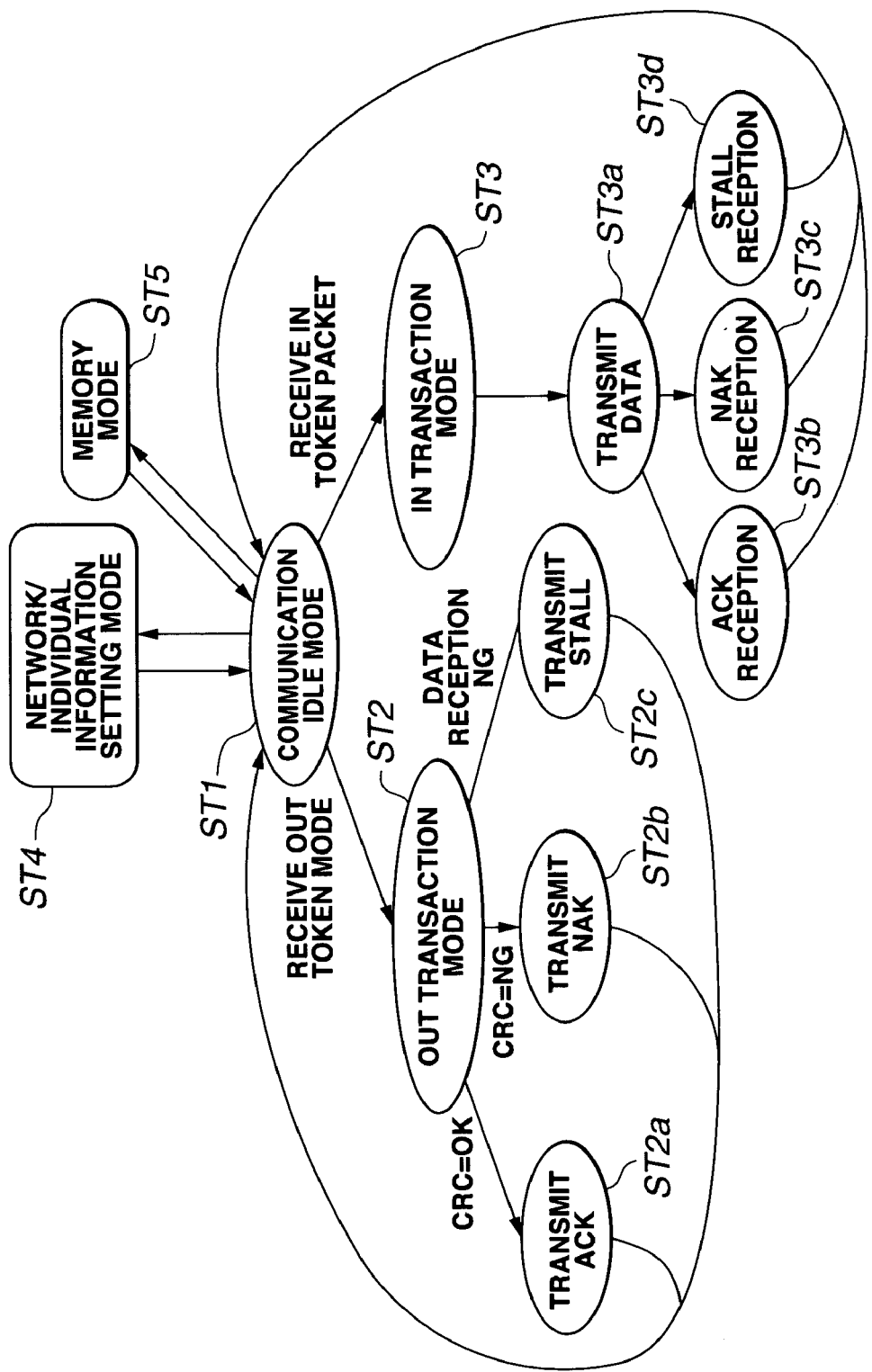
FIG. 26 shows the state transition of the operation mode of the radio communication device with a memory function constituting the wireless LAN system according to the present invention.

Also, with the radio communication device with a memory function 200, as shown in FIG. 26, when a control packet in which control data indicating "memory mode packet" as PID data is stored is inputted from the host equipment 4 to the radio communication CPU 89 in a communication idle mode (step ST1), the radio communication CPU 89 enters a memory mode (step ST5) for writing, reading, updating and erasing image data in the flash memory 111.

In the memory mode, the radio communication CPU 89 controls the memory controller 112 to carry out processing such as writing to the flash memory 111, and then returns to the communication idle mode (step ST1).

In the case where connection with the public communication network 40 is made via the portable telephone 2, when a control packet to the effect that image data is to be transmitted to the WWW server is inputted from the host equipment 4, the radio communication CPU 89 carries out processing to packetize image data as user data and transmit the packetized image data to the WWW server.

Figure 27:
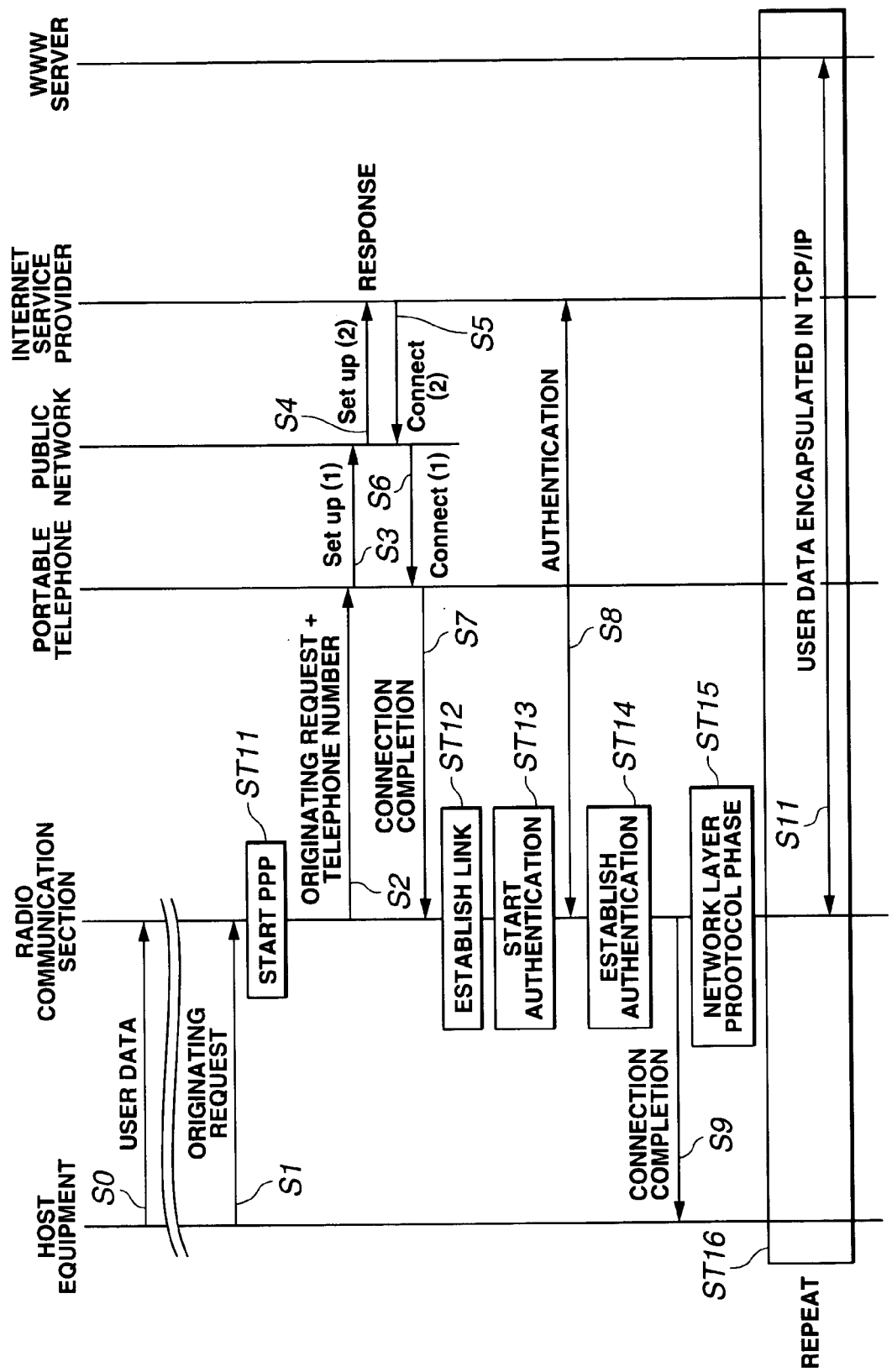
FIG. 27 is a flowchart for explaining another example of processing procedure of the radio communication device in connecting the host equipment to the Internet.

The processing carried out by the radio communication CPU 89 when connecting the host equipment 4 with the WWW server of the public communication network 40 in the wireless LAN system 1 having the above-described radio communication device with a memory function 200 will now be described with reference to the flowchart of FIG. 27. In the description of FIG. 27, steps ST similar to those in the foregoing flowchart are denoted by the same step numbers and will not be described further in detail.

In FIG. 27, the flash memory 111 of the radio communication device with a memory function 200 assumes that user data S0 representing an image shot by the digital camera is transmitted and stored in advance in the radio communication device with a memory function 200, for example, as shown in FIG. 24.

Then, the host CPU 102 transmits a control packet indicating an originating request S1 for originating the user data from the host equipment 4 to the WWW server included in the public communication network 40, to the radio communication CPU 89.

Then, in response to the originating request S1, the host CPU 102 at step ST11 starts the PPP stored, for example, in the ROM 88.

The radio communication CPU 89 carries out processing to generate a control packet having the originating request and telephone number S2 stored in PAYLOAD with reference to the telephone number of the Internet service provider stored in the network setting storage section 86, and transmits the originating request and telephone number S2 to the portable telephone 2 via the short distance radio communication network 30.

Next, the portable telephone 2 transmits first call setting S3 (Set up (1)) to the public network in response to the originating request and telephone number from the radio communication device with a memory function 200. In response to this, the public network transmits second call setting S4 (Set up (2)) having the contents similar to those of the first call setting S3, to the Internet service provider. In this case, as the Internet service provider responds, the public network is supplied with and receives first connection information S5 (Connect (2)) for confirming the connection from the Internet service provider. In response to the reception of the first connection information S5, the public network transmits second connection information S6 (Connect (1)) having the contents similar to those of the first connection information S5, to the portable telephone 2.

The portable telephone 2 transmits connection completion information S7 indicating that the connection with the Internet service provider is completed, to the radio communication device with a memory function 200 via the short distance radio communication network 30.

At the next step ST12, the radio communication CPU 89 shifts to a link establishment phase as the PPP in response to the connection completion information S7 received from the portable telephone 2.

At the next step ST13, the radio communication CPU 89 carries out authentication processing based on the PPP. In this case, the radio communication CPU 89 reads out the user ID and password from the individual information storage section 85 and then transmits/receives authentication information S8 for mutual authentication with the Internet service provider via the portable telephone 2 and the public network in accordance with the PPP, thus carrying out the authentication processing.

At the next step ST14, the radio communication CPU 89 completes the authentication processing by transmitting/receiving the authentication information S8 to/from the Internet service provider, and then enters an authentication establishment phase. The radio communication CPU 89 outputs a control packet including connection completion information S9 indicating that the connection between the radio communication device with a memory function 200 and the Internet service provider is completed, to the host CPU 102 of the host equipment 4.

At the next step ST15, the radio communication CPU 89 shifts to a network layer protocol phase in response to the completion of the authentication processing at step ST14. That is, the radio communication CPU 89 makes connection with the public communication network 40 by using the IP and TCP mounted in the protocol stack.

At the next step ST16, the radio communication CPU 89 generates a control packet including the user data S0 stored in the flash memory 111, then packetizes the user data S0 by adding control information to the user data S0 in accordance with the TCP and IP, and carries out transmission/reception of packetized user data S11 between the radio communication device with a memory function 200 and the WWW server in the public communication network 40.

With the radio communication device with a memory function 200, the user data stored in the flash memory 111 can be transmitted to and received from the public communication network 40 without using the host equipment 4, and similarly to the foregoing radio communication device 3, connection with the Internet service provider can be made by causing the radio communication CPU 89 to start the PPP and using the individual information and the network setting information. Thus, the network setting or the like for each host equipment for connection with the public communication network 40 can be simplified, and it is not necessary to provide the host equipment 4 with a built-in function to construct the wireless LAN system 1 or with a built-in function to connect to the public communication network 40. Therefore, the cost of the host equipment 4 can be reduced.

The processing carried out by the radio communication CPU 89 when receiving user data from the host equipment 4 and transmitting the user data to the server included in the public communication network 40 via the portable telephone 2 will now be described with reference to FIGS. 28 and 29.

Figure 28:
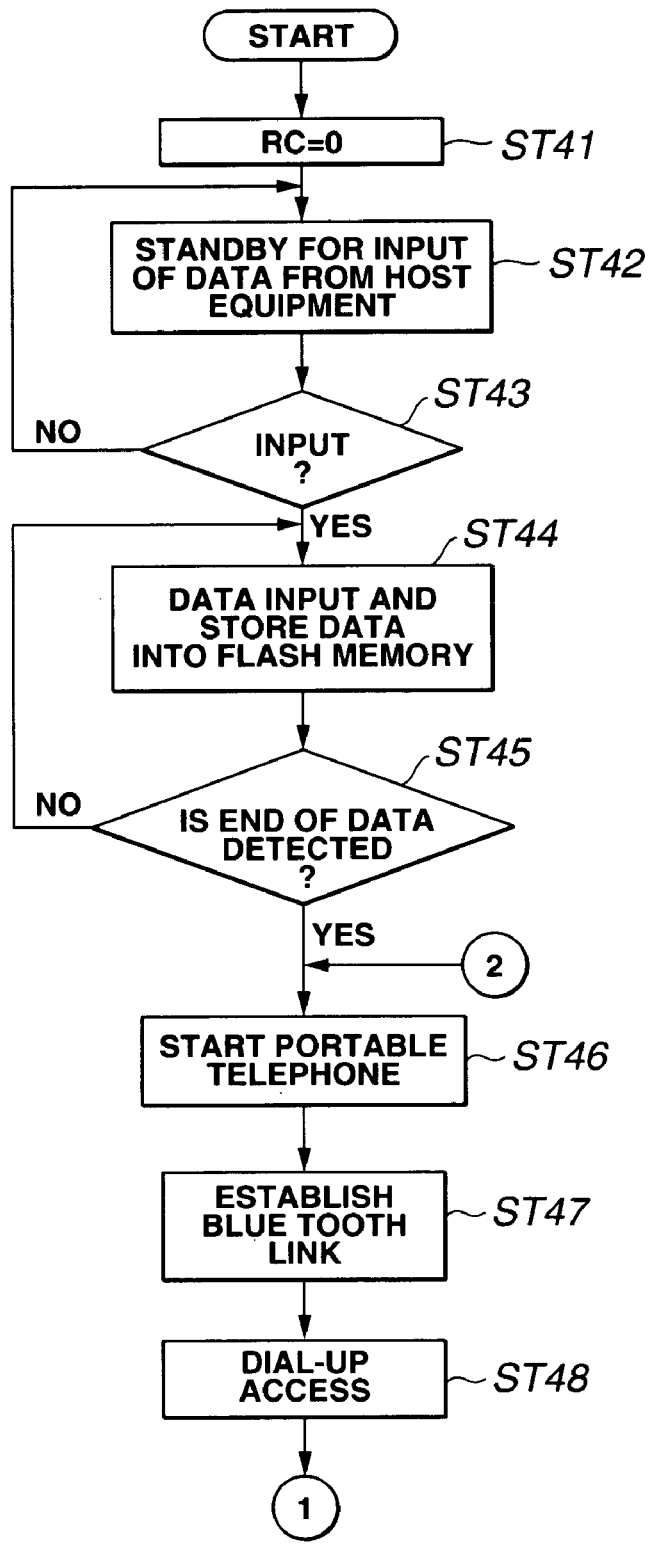
FIG. 28 is a flowchart showing the processing of a radio communication CPU in receiving user data from the host equipment and transmitting the user data to a server included in the Internet via a portable telephone.
Figure 29:
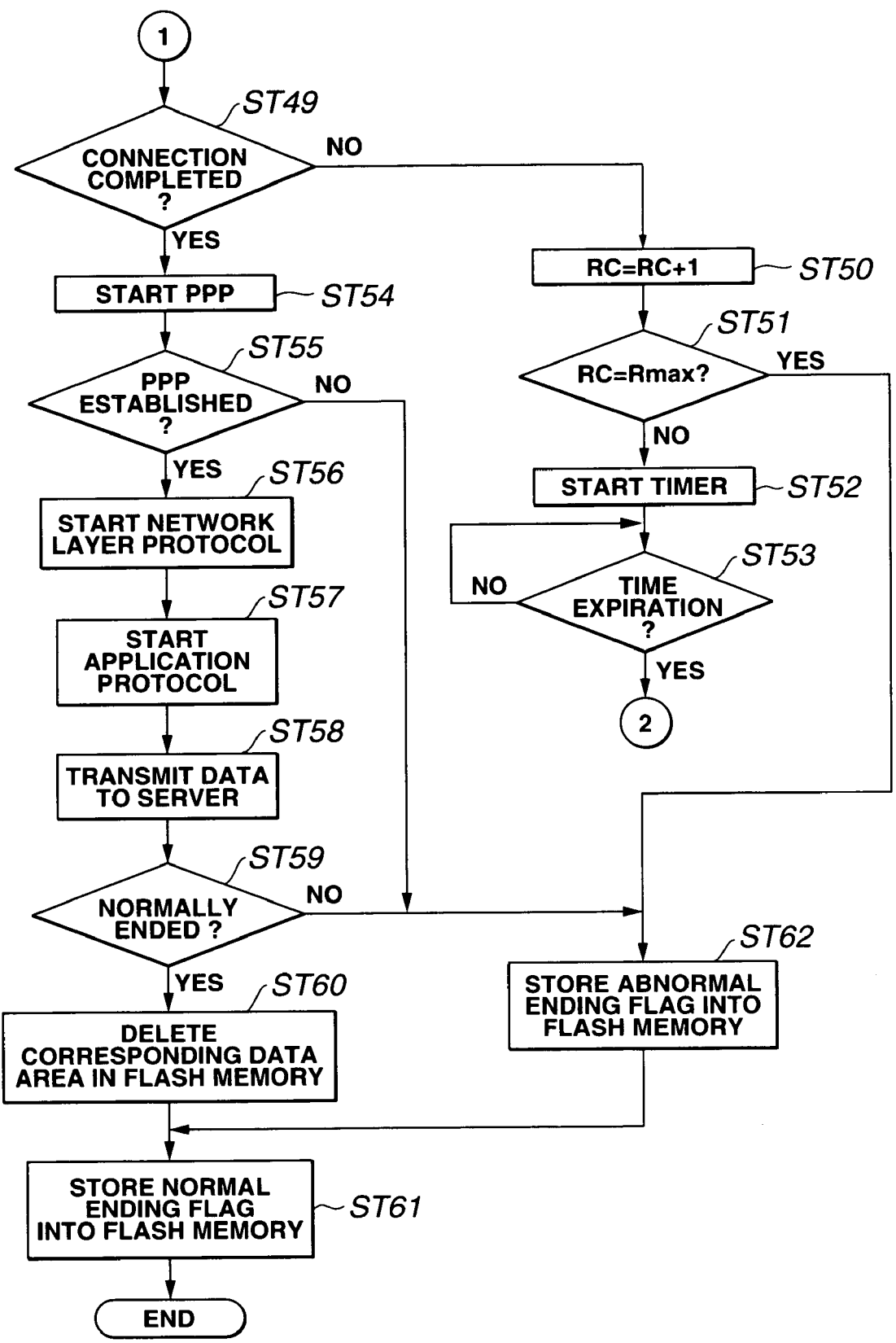
FIG. 29 is a flowchart showing the processing of a radio communication CPU in receiving user data from the host equipment and transmitting the user data to a server included in the Internet via a portable telephone.

In FIG. 28, first, at step ST41, the radio communication CPU 89 sets the number of redial calls (RC) with respect to the portable telephone 2 to zero (RC=0).

At the next step ST42, the radio communication CPU 89 enters a standby state for inputting user data from the host equipment 4. At the next step ST43, when it is detected by the interface section 113 that the user data is inputted from the host equipment 4, the radio communication CPU 89 goes to step ST44. When the user data is not inputted from the host equipment 4, the radio communication CPU 89 returns to step ST42 and repeats steps ST42 and ST43 until the user data is inputted.

At step ST44, in response to the input of a control packet including the user data to the interface section 113, the radio communication CPU 89 controls the interface section 113 and the memory controller 112 so as to store the user data into the flash memory 111.

At the next step ST45, the radio communication CPU 89 discriminates whether or not the end of the user data received at step ST44 is detected by the interface section 113. When it is discriminated that the end of the user data is not detected by the interface section 113, the radio communication CPU 89 returns to step ST44 and repeats the processing of steps ST44 and ST45 until the end of the user data is detected by the interface section 113 and all the user data is stored in the flash memory 111. When it is discriminated that the end of the user data is detected by the interface section 113, the radio communication CPU 89 goes to step ST46.

At step ST46, the radio communication CPU 89 transmits a control packet including a control command to the effect that the power should be turned on, to the portable telephone 2 and thus starts the portable telephone 2.

At the next step ST47, the radio communication CPU 89 starts the physical layer (PHY), media access control layer (MAC) and logical link control layer (LLC) stored in the ROM 88, thereby establishing a link with the portable telephone 2 in accordance with the Bluetooth system.

At the next step ST48, the radio communication CPU 89 transmits the control packet including the telephone number of the Internet service provider to the portable telephone 2. Thus, the radio communication CPU 89 controls the portable telephone 2 so as to make dial-up access for connecting to the Internet service provider via the portable telephone 2 and then goes to step ST49 shown in FIG. 29.

At step ST49, the radio communication CPU 89 discriminates whether or not the portable telephone 2 completed the connection to the Internet service provider at step ST48. When it is discriminated that the portable telephone 2 completed the connection to the Internet service provider, the radio communication CPU 89 goes to step ST54. When it is discriminated that the portable telephone 2 did not complete the connection to the Internet service provider, the radio communication CPU 89 goes to step ST50. The case where the portable telephone 2 does not complete the connection with the Internet service provider is, for example, the case where the portable telephone 2 cannot receive radio waves, that is, the case where the portable telephone 2 is out of the radio wave reception area. In this case, a control packet indicating that the connection cannot be made is inputted to the radio communication CPU 89 from the portable telephone 2.

At step ST50, the number of redial calls is incremented.

At the next step ST51, the radio communication CPU 89 discriminates whether or not a preset maximum value Rmax of the number of redial calls coincides with the number of redial calls after the increment at step ST50. When it is discriminated that the maximum value Rmax of the number of redial calls coincides with the number of redial calls after the increment, the radio communication CPU 89 goes to step ST62. When it is discriminated that the maximum value Rmax of the number of redial calls is not coincident with the number of redial calls after the increment at step ST50, the radio communication CPU 89 goes to step ST52.

At step ST52, the radio communication CPU 89 starts its built-in timer.

At the next step ST53, the radio communication CPU 89 repeats discrimination as to whether the timer started at step ST52 has reached a predetermined expiration time or not. When it is discriminated that the timer has reached the expiration time, the radio communication CPU 89 returns to step ST46 of FIG. 28 and executes the processing of step ST46 and the subsequent steps again. That is, when the dial-up access to the Internet service provider cannot be established before the expiration of the timer, the radio communication CPU 89 repeats the processing of step ST46 and the subsequent steps after the expiration of the timer.

At step ST54, which is reached by discriminating at step ST49 that the portable telephone 2 completed the dial-up access to the Internet service provider, the radio communication CPU 89 starts the PPP stored in the ROM 88.

At the next step ST55, the radio communication CPU 89 starts the PPP stored in the ROM 88, then generates a control packet including the originating request and telephone number S2 with reference to the telephone number of the Internet service provider, and transmits the originating request and telephone number to the portable telephone 2 via the short distance radio communication network 30. Then, the radio communication CPU 89 discriminates whether the control packet to the effect that the connection is completed is inputted from the portable telephone 2 or not and whether the link based on the PPP is established or not. When a control packet indicating that the link based on the PPP between the portable telephone 2 and the Internet service provider cannot be established is inputted from the portable telephone 2, the radio communication CPU 89 goes to step ST62. When it is discriminated that the link based on the PPP between the portable telephone 2 and the Internet service provider is established, the radio communication CPU 89 goes to step ST56.

At step ST56, the radio communication CPU 89 starts the TCP/IP stored in the ROM 88 as the network layer protocol. Thus, the radio communication CPU 89 makes connection with the server included in the public communication network 40 and establishes the link.

At the next step ST57, the radio communication CPU 89 starts an electronic mail application protocol such as POP3 (post office protocol 3), SMTP (simple mail transfer protocol), or IMAP (Internet message access protocol).

At the next step ST58, the radio communication CPU 89 transmits the user data stored in the flash memory 111 to the server via the portable telephone 2 and the Internet service provider, in conformity with the network layer protocol and the application protocol started at steps ST56 and ST57.

At the next step ST59, the radio communication CPU 89 discriminates whether the user data transmitted at step ST58 has been transmitted to the server and has ended normally or not. When it is discriminated that the user data has ended normally, the radio communication CPU 89 goes to step ST60. When it is discriminated that the user data has not ended normally, the radio communication CPU 89 goes to step ST62.

At step ST60, in response to the normal ending of the user data at step ST59, the radio communication CPU 89 controls the memory controller 112 so as to delete the user data stored in the flash memory 111.

At step ST61, the radio communication CPU 89 controls the memory controller 112 so as to store a normal ending flag into a memory space of the flash memory 111 deleted at step ST60, and then ends the processing.

At step ST62, that is, in the case where it is discriminated at step ST51 that the maximum value Rmax of the number of redial calls is coincident with the number of redial calls after the increment, or in the case where the link based on the PPP between the portable telephone 2 and the Internet service provider is not established, or in the case where it is discriminated at step ST59 that the user data has not ended normally, the radio communication CPU 89 stores into the flash memory 111 an abnormal ending flag indicating that the user data to be transmitted to the server cannot be transmitted to the server, and then ends the processing.

In the above description of the present invention, the radio communication device 3 or the radio communication device with a memory function 200 is loaded in the host equipment 4, thus transmitting/receiving user data between the host equipment 4 and the public communication network 40. However, the radio communication device 3 or the radio communication device with a memory function 200 may also be loaded in the portable telephone 2.

Figure 30:
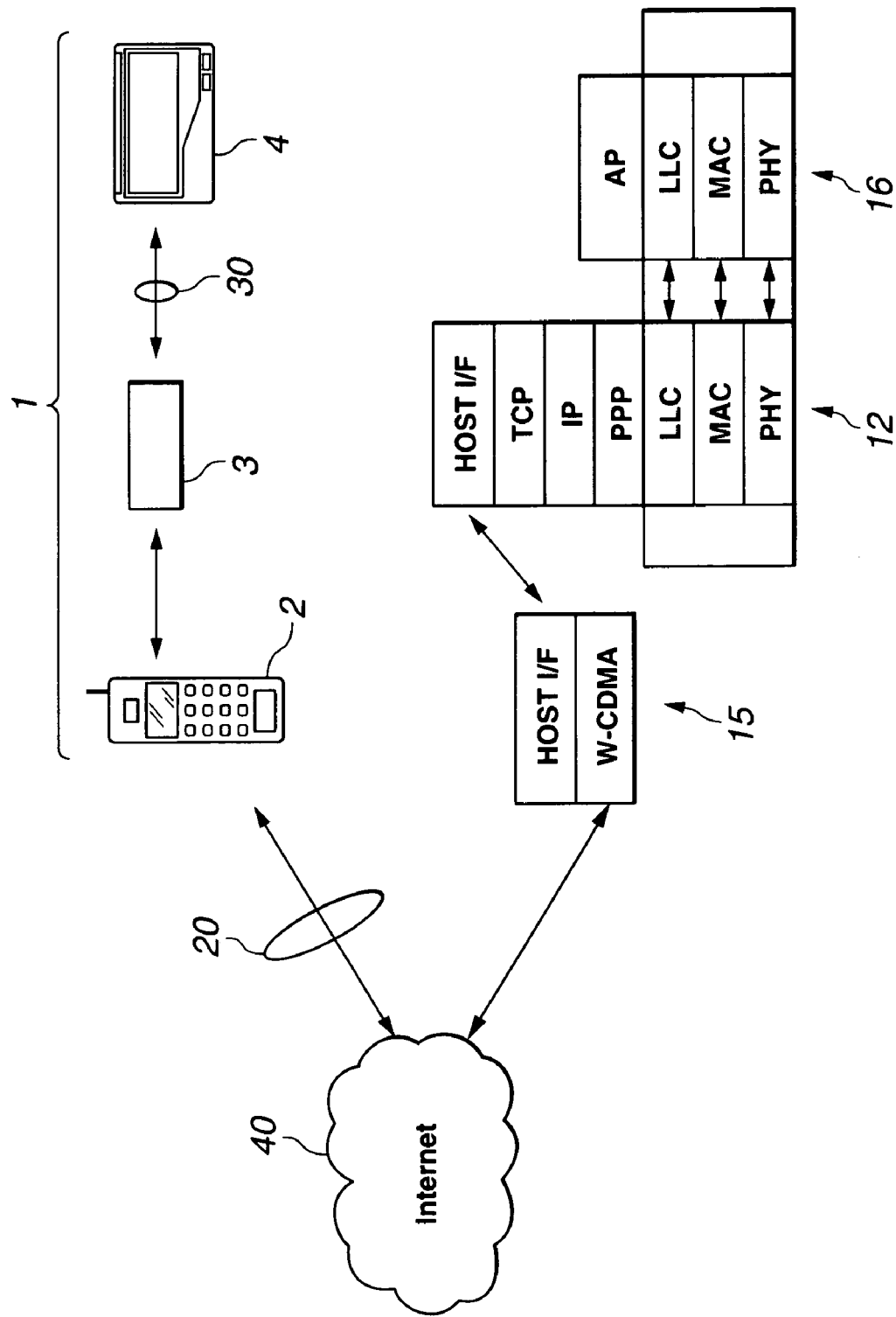
FIG. 30 shows another structure of the wireless LAN system according to the present invention and protocol stacks for respective equipments constituting the wireless LAN system.
Figure 31:
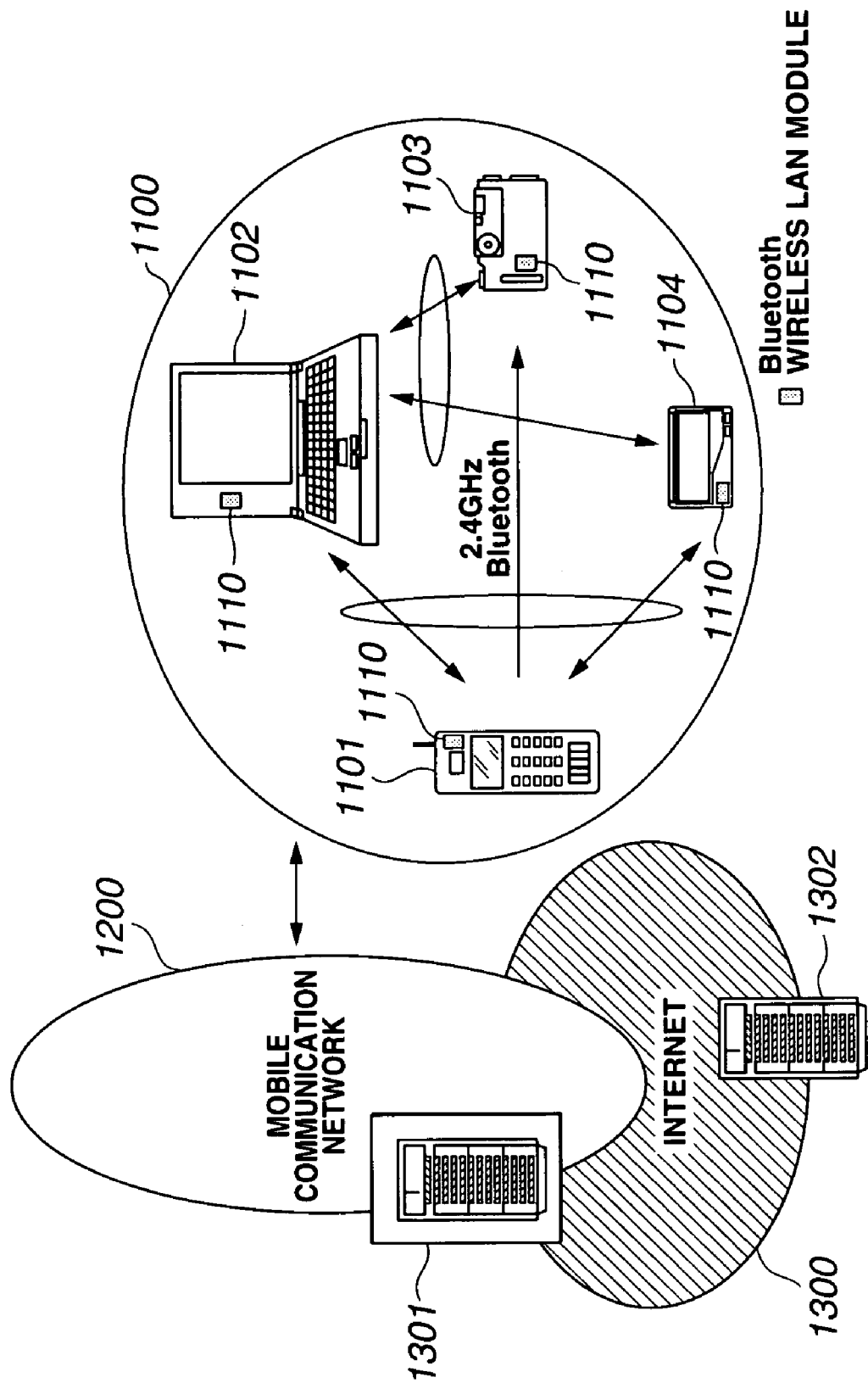
FIG. 31 shows a conventional wireless LAN system.
Figure 32:
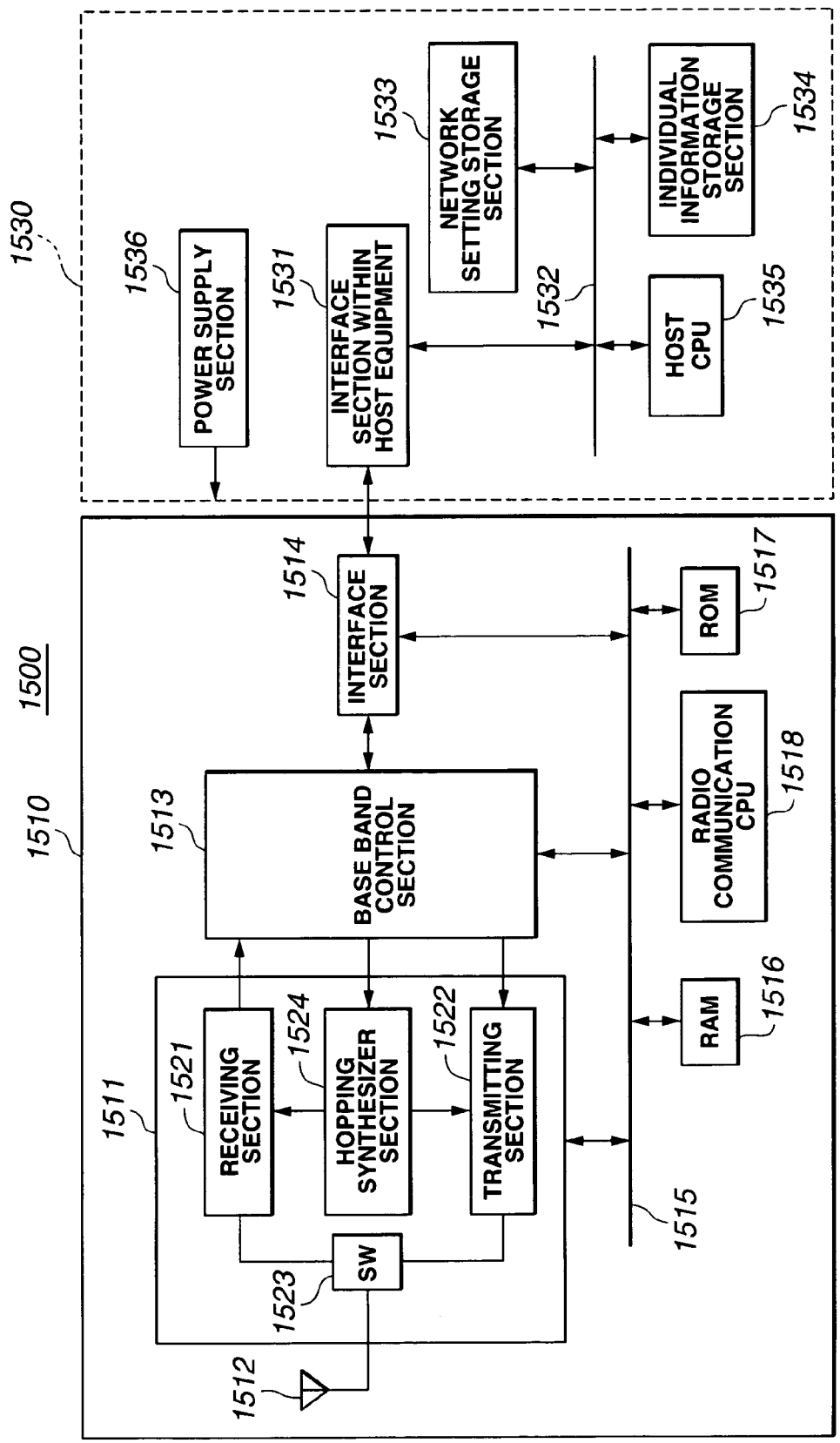
FIG. 32 is a block diagram showing a host equipment provided in the conventional wireless LAN system.
Figure 33:
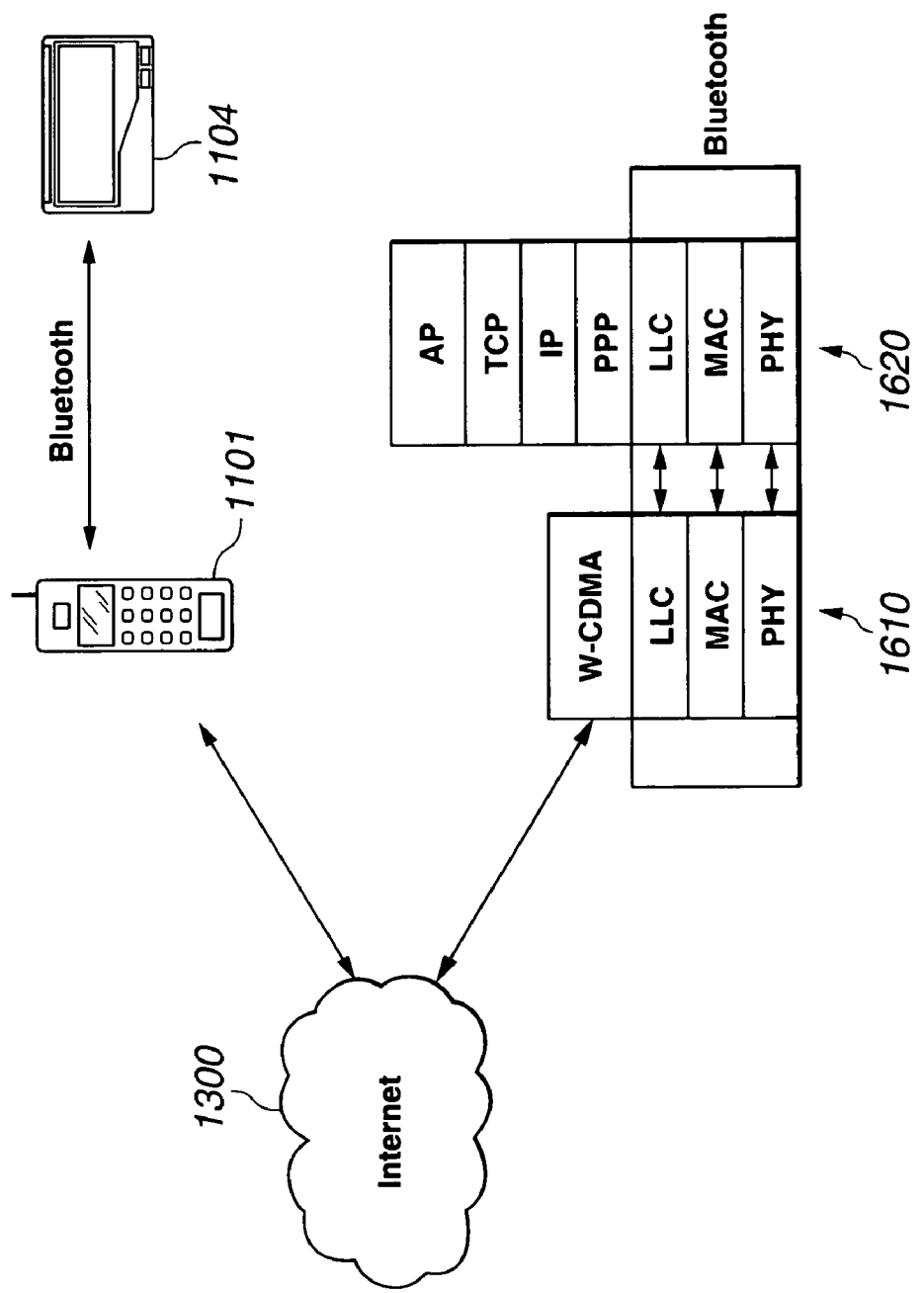
FIG. 33 is a view for explaining the wireless LAN system using a conventional first technique.
Figure 34:
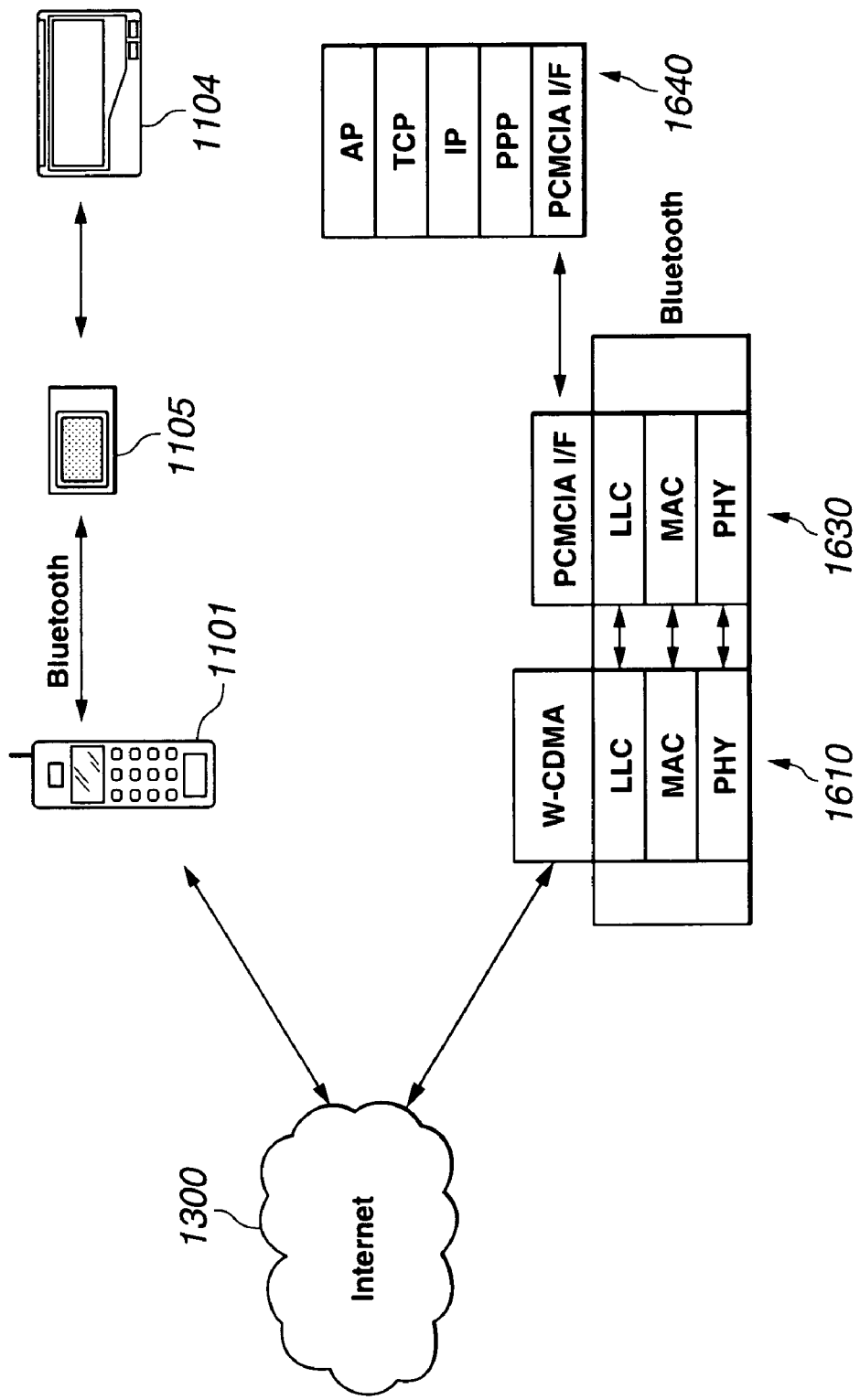
FIG. 34 is a view for explaining the wireless LAN system using a conventional second technique.

Such a wireless LAN system 1 is constituted by the portable telephone 2 having mounted thereon a protocol stack 15 including a W-CDMA layer and a HOST I/F layer as the upper layer of the W-CDMA layer, the radio communication device 3 having the above-described protocol stack 12 mounted thereon, and the host equipment 4 having mounted thereon a protocol stack 16 including a PHY layer, a MAC layer, an LLC layer, and an application layer as the upper layer for transmitting/receiving a control packet via the short distance radio communication network 30, as shown in FIG. 30. In such a wireless LAN system 1, the portable telephone 2 and the radio communication device 3 transmit/receive a control packet to/from each other via the HOST I/F, and the radio communication device 3 and the host equipment 4 transmit a control packet to each other via the short distance radio communication network 30, thus connecting the host equipment 4 with the public communication network 40.

In the wireless LAN system 1, since the radio communication device 3 or the radio communication device with a memory function 200 is provided in the portable telephone 2, similarly to the wireless LAN system 1 shown in FIGS. 1, 2 and 21, the host equipment 4 can be connected with the Internet service provider by causing the radio communication CPU 89 to start the PPP and using the individual information and the network setting information, and the network setting or the like for each host equipment 4 to connect to the public communication network 40 can be simplified. Also, it is not necessary to provide the host equipment 4 with a built-in function to construct the wireless LAN system 1 and a built-in function to connect to the public communication network 40, and the cost of the host equipment 4 can be reduced.

In the above description of the wireless LAN system 1, the password for using the individual information is stored in the individual information storage section 85. However, the password may also be stored in the host equipment 4 in order to keep security.

In such a wireless LAN system 1, when connecting the host equipment 4 with the public communication network 40 via the radio communication device 3 or the radio communication device with a memory function 200, first, a control packet containing the password is transmitted from the host equipment 4 to the radio communication CPU 89 of the radio communication device 3 or the radio communication device with a memory function 200. Then, in response to the password inputted from the host equipment 4, the radio communication CPU 89 discriminates whether the individual information stored in the individual information storage section 85 is usable or not. When it is discriminated that the individual information is usable, the radio communication CPU 89 starts connection with the public communication network 40 by using the individual information.

In the wireless LAN system 1, by enabling the use of the individual information only when the password stored in the host equipment 4 is permitted, the security of the individual information and the network setting information stored in the radio communication device 3 or the radio communication device with a memory function 200 can be secured.

In the above-described embodiment, a PDA, a digital camera, a mail terminal, an EMD terminal and the like are used as examples of the host equipment 4. However, it is a matter of course that other types of host equipments 4 are also applicable. By connecting the radio communication device 3 of the present invention to all kinds of electronic equipment, for example, a portable telephone or a game machine, and then carrying out the above-described processing, services based on the communication with the public communication network 40 can be provided via the short distance radio communication network 30 and a gateway.

With respect to the radio communication device 3 and the radio communication device with a memory function 200 in the above-described embodiment, the present invention can be applied on the basis of the physical specification and the data communication specification of various types of flash memory cards. Specifically, according to the present invention, a chip or the like for the Bluetooth system for carrying out the above-described processing can be mounted on the basis of the physical specification and the data communication specification of flash memories such as a compact flash (with a longitudinal dimension of 361 mm, a lateral dimension of 42 μm and a thickness of 3.3 mm) proposed by Sun Disk of the United States, a smart medium (with a longitudinal dimension of 45 in, a lateral dimension of 37 in and a thickness of 0.76 mm) (official name: Solid State Floppy Disk Card) proposed by Toshiba, a multimedia card (with a longitudinal dimension of 32 mm, a lateral dimension of 24 mm and a thickness of 1.4 mm) standardized by a group called Multi Media Card Association, and an SD memory card (with a longitudinal dimension of 32 μm, a lateral dimension of 24 mm and a thickness of 2.1 mm) developed by Matsushita Electric, Sun Disk of the United States, and Toshiba.

Moreover, in the above-described embodiment, radio waves of a 2.4-GHz band are transmitted/received within the short distance radio communication network 30, thus connecting the host equipment 4 with the public communication network 40. However, as a matter of course, the present invention can be applied to the case where the host equipment 4 is connected with the public communication network 40 in a home network using radio waves of a 5-GHz band, as proposed in the IEEE (Institute of Electrical and Electronics Engineers) 802.11.

INDUSTRIAL APPLICABILITY

In the communication device according to the present invention, a connection relation with a communication network is set by using communication setting information stored in storage means, and transmission/reception of data between a host equipment and an equipment included in the communication network can be controlled. Therefore, it is not necessary to carry out communication setting for connecting to the Internet or the like for each host equipment constituting a short distance radio communication network, and transmission/reception of data between the host equipment and the communication network can be simplified.

In the communication method according to the present invention, a connection relation between a communication device and a communication network via a short distance radio communication network is set by using communication setting information stored within the communication device, and transmission/reception of data is carried out between the communication device and the communication network. Also, wired supply/reception of data is carried out between a host equipment and the communication device, and transmission/reception of data is carried out between the host equipment and the communication network. Therefore, it is not necessary to carry out communication setting for connecting to the Internet or the like for each host equipment constituting the short distance radio communication network, and transmission/reception of data between the host equipment and the communication network can be simplified.

Moreover, in the communication device according to the present invention, wires communication means, short distance radio communication means, storage means, and communication control means are housed in a single casing. The wired communication means is arranged on one side of the communication control means, and the short distance radio communication means is arranged on the other side of the communication control means. Therefore, simply by loading the communication device into a host equipment, wired supply/reception of data to/from the host equipment is carried out and transmission/reception of data can be carried out between the host equipment and the communication network. Thus, with this communication device, it is not necessary to carry out communication setting for connecting to the Internet or the like for each host equipment, and transmission/reception of data between the host equipment and the communication network can be simplified.

Also, in the communication device according to the present invention, wired communication means, short distance radio communication means, storage means, and communication control means are housed in a casing having such an outer dimension that at least a part thereof can be attached to/detached from a recessed connecting section provided on a host equipment. Therefore, simply by loading the communication device into the host equipment, wired supply/reception of data to/from the host equipment is carried out and transmission/reception of data can be carried out between the host equipment and the communication network. Thus, with this communication device, it is not necessary to carry out communication setting for connecting to the Internet or the like for each host equipment, and transmission/reception of data between the host equipment and the communication network can be simplified.

Furthermore, in the communication terminal device according to the present invention, connection with a communication network is established via a public communication network by using communication setting information, and transmission/reception of data is carried out between another equipment and the communication network by using the connection relation with the communication network set by communication connection setting means. Therefore, it is not necessary to carry out communication setting for connecting to the Internet or the like for each host equipment constituting a short distance radio communication network, and transmission/reception of data between the host equipment and the communication network can be simplified.

What is claimed is:

1. A communication device comprising:
   wired communication means for providing/receiving data via physical connection means to/from a mounted host equipment;
   short distance radio communication means for transmitting/receiving data to/from an external communication network via a short distance radio communication network;
   storage means in which communication setting information as information related to the communication network, and at least protocols of an upper protocol layer and protocols of a lower protocol layer are stored; and
   communication control means for setting a connection relation with the communication network via the short distance radio communication network using the protocols of the lower protocol layer based upon the communication setting information stored in the storage means, and controlling transmission/reception of data between the communication network and the host equipment using at least one protocol of the upper protocol layer, wherein
   the lower protocol layer includes protocols for communication in the short distance radio communication network; and
   the upper protocol layer includes at least one protocol of point to point (PPP), Internet protocol (IP), and transport control protocol (TCP) for communication with the external communication network.

2. The communication device as claimed in claim 1, wherein individual information is stored in the storage means as information related to a user operating the host equipment, and wherein the communication control means sets the connection between the host equipment and the communication network by using the communication setting information and the individual information stored in the storage means.

3. The communication device as claimed in claim 1, further comprising discrimination means for discriminating whether to set the connection between the host equipment and the communication network by using at least one protocol of PPP (point to point protocol), IP (Internet protocol), and TCP (transport control protocol) stored in the host equipment and carry out transmission/reception of data between the host equipment and the communication network, or to set the connection between the host equipment and the communication network by using at least one protocol stored in the storage means and carry out transmission/reception of data between the host equipment and the communication network, wherein in accordance with a result of discrimination that the connection between the host equipment and the communication network is set by using at least one protocol stored in the storage means and that transmission/reception of data is carried out between the host equipment and the communication network, the communication control means sets the connection between the host equipment and the communication network by using at least one protocol stored in the storage means and controls transmission/reception of data between the host equipment and the communication network.

4. The communication device as claimed in claim 2, wherein the communication control means discriminates whether the individual information stored in the storage means is usable by using password information inputted from the host equipment, and sets the connection between the host equipment and the communication network on a basis of a result of discrimination.

5. The communication device as claimed in claim 1, wherein the storage means temporarily stores data inputted from the host equipment via the wired communication means, and wherein the communication control means carries out control so as to transmit/receive the data temporarily stored in the storage means to/from the communication network.

6. The communication device as claimed in claim 1, wherein the communication control means sets a connection relation between a public communication network and the host equipment and controls transmission/reception of data between the host equipment and the public communication network.

7. A communication method for a communication device having a wired communication section for supplying/receiving data to/from a host equipment via physical contact means and a short distance radio communication section for transmitting/receiving data to/from an external communication network via a short distance radio communication network, the method comprising the steps of:

storing communication setting information as information related to the communication network, protocols of an upper protocol layer, and protocols of a lower protocol layer in the communication device;

using protocols of the lower protocol layer to set a connection relation between the radio communication section and the communication network via the short distance radio communication network based upon the communication setting information stored in the communication device as information related to a communication network outside the short distance radio communication network; and carrying out transmission/reception of data between the communication device and the communication network by using the connection relation between the communication device and the communication network, and carrying out supply/reception of data between the host equipment and the communication device using at least one protocol of the upper protocol layer to control transmission/reception of data between the host equipment and the communication network, wherein the lower protocol layer includes protocols for communication in the short distance radio communication network; and the upper protocol layer includes at least one protocol of point to point (PPP), Internet protocol (IP), and transport control protocol (TCP) for communication with the external communication network.

8. The communication method as claimed in claim 7, wherein a connection relation between the host equipment and the communication network is set by using individual information stored in the communication device, wherein The individual information is information related to a user operating the host equipment.

9. The communication method as claimed in claim 7, wherein it is discriminated whether to set the connection relation between the host equipment and the communication network by using at least one protocol of PPP (point to point protocol), IP (Internet protocol), and TCP (transport control protocol) stored in the host equipment and carry out transmission/reception of data between the host equipment and the communication network, or to set the connection relation between the host equipment and the communication network by using at least one protocol stored in the communication device and carry out transmission/reception of data between the host equipment and the communication network, and wherein in accordance with a result of discrimination that the connection relation between the host equipment and the communication network is set by using at least one protocol stored in the communication device and that transmission/reception of data is carried out between the host equipment and the communication network, the connection relation between the host equipment and the communication network is set by using at least one protocol stored in the communication device and transmission/reception of data is carried out between the host equipment and the communication network.

10. The communication method as claimed in claim 8, wherein it is discriminated whether the individual information is usable by using password information inputted from the host equipment to the communication device, and wherein the connection relation between the communication device and the communication network is set on a basis of a result of discrimination.

11. The communication method as claimed in claim 7, wherein data inputted from the host equipment to the communication device is stored, and wherein transmission/reception of the stored data is carried out between the communication device and the communication network.

12. The communication method as claimed in claim 7, wherein a connection relation between a public communication network and the communication device is set, and
wherein transmission/reception of data is carried out between the public communication network and the host equipment.

13. A communication device comprising:
wired communication means for providing/receiving data via physical contact means to/from a mounted host equipment;
short distance radio communication means for providing/receiving data to/from an external communication network via a short distance radio communication network;
storage means in which communication setting information as information related to the communication network and at least protocols of an upper protocol layer and protocols of a lower protocol layer are stored; and
communication control means for setting a connection relation with the communication network via the short distance radio communication network using protocols of the lower protocol layer based upon the communication setting information stored in the storage means, and controlling transmission/reception of data between the communication network and the host equipment using at least one protocol of the upper protocol layer, wherein
the wired communication means, the short distance radio communication means, the storage means, and the communication control means are housed in a single casing;
the wired communication means is arranged on one side of the communication control means, and the short distance radio communication means is arranged on the other side of the communication control means
the lower protocol layer includes protocols for communication in the short distance radio communication network; and
the upper protocol layer includes at least one protocol of point to point (PPP), Internet protocol (IP), and transport control protocol (TCP) for communication with the external communication network.

14. The communication device as claimed in claim 13, wherein
the casing is substantially rectangular, having a height greater than a width, and a thickness smaller than the width, and
wherein the short distance radio communication means is arranged on a first end of the casing, and the wired communication means is arranged on a second end of the casing.

15. The communication device as claimed in claim 14, wherein a thickness of the casing is greater on the second end than on the first end.

16. A communication device comprising, in a casing constituted to have a predetermined outer dimension that allows free attachment/detachment of at least a part thereof to/from a recessed connection part provided in a mounted host equipment:
wired communication means for providing/receiving data via physical contact means to/from the host equipment;
short distance radio communication means for providing/receiving data to/from an external communication network via a short distance radio communication network;
storage means in which communication setting information as information related to the communication network, and at least protocols of an upper protocol layer and protocols of a lower protocol layer are stored; and
communication control means for setting a connection relation with the communication network via the short distance radio communication network using the protocols of the lower protocol layer based upon the communication setting information stored in the storage means, and controlling transmission/reception of data between the communication network and the host equipment using at least one protocol of the upper protocol layer, wherein
the lower protocol layer includes protocols for communication in the short distance radio communication network; and
the upper protocol layer includes at least one protocol of point to point (PPP), Internet protocol (IP), and transport control protocol (TCP) for communication with the external communication network.

17. The communication device as claimed in claim 16, wherein
the casing is substantially rectangular, having a height greater than a width, and a thickness smaller than the width, and
wherein the short distance radio communication means is arranged on a first end of the casing, and the wired communication means is arranged on a second end of the casing.

18. The communication device as claimed in claim 17, wherein the casing is connected to the recessed connection part of the host equipment, with the other end exposed outside from the host equipment.

19. The communication device as claimed in claim 17, wherein the short distance radio communication means includes a chip antenna shaped in a thin, substantially rectangular form and carries out transmission/reception of data to/from the short distance radio communication network via the chip antenna.

20. The communication device as claimed in claim 19, wherein the chip antenna is housed in the second end of the casing having a protrusion with its thickness greater at the second end than the first end.

21. A communication terminal device comprising:
public communication connection means operated by a user so as to be connected to a public communication network for providing/receiving data;
short distance radio communication means for transmitting/receiving data to/from an equipment included in a short distance radio communication network via the short distance radio communication network;
communication setting information storage means in which communication setting information is stored as information related to an external communication network to be connected via the public communication network along with protocols of an upper protocol layer and protocols of a lower protocol layer;
communication connection setting means for setting connection with the communication network via the public communication network by using protocols of the lower protocol layer based upon the communication setting information stored in the communication setting information storage means; and control means for controlling transmission/reception of data between the equipment and the communication network by using the connection with the communication network set by the communication connection setting means and by using at least one protocol of the upper protocol layer, wherein the lower protocol layer includes protocols for communication in the short distance radio communication network; and the upper protocol layer includes at least one protocol of point to point (PPP), Internet protocol (IP), and transport control protocol (TCP) for communication with the external communication network.

22. The communication terminal device as claimed in claim 21, further comprising individual information storage means in which individual information is stored as information related to the user, wherein the communication connection setting means sets the connection between the short distance radio communication means and the communication network by using the communication setting information stored in the communication setting information storage means and the individual information stored in the individual information storage means.

23. The communication terminal device as claimed in claim 21, further comprising discrimination means for discriminating whether to set the connection between the short distance radio communication means and the communication network by using at least one protocol of PPP (point to point protocol), IP (Internet protocol), and TCP (transport control protocol) stored in the equipment and carry out transmission/reception of data between the equipment and the communication network, or to set connection between the short distance radio communication means and the communication network by using at least one protocol stored in the communication setting information storage means and carry out transmission/reception of data between the equipment and the communication network, wherein in accordance with a result of discrimination that the connection between the short distance radio communication means and the communication network is set by using at least one protocol stored in the communication setting information storage means and that transmission/reception of data is carried out between the equipment and the communication network, the communication connection setting means sets the connection between the short distance radio communication means and the communication network by using at least one protocol stored in the communication setting information storage means, and the control means controls transmission/reception of data between the equipment and the communication network by using at least one protocol stored in the communication setting information storage means.

24. The communication terminal device as claimed in claim 22, further comprising password processing means for discriminating whether the individual information stored in the individual information storage means is usable by using a password inputted from the equipment, wherein the communication connection setting means sets the connection with the communication network via the public communication network on a basis of a result of discrimination from the password processing means.

25. The communication terminal device as claimed in claim 21, further comprising data storage means for storing data inputted from equipment via the short distance radio communication means, wherein the control means controls transmission/reception of the data stored in the data storage means to/from the communication network.

26. The communication terminal device as claimed in claim 25, wherein the control means controls processing to set the connection again, in response to discrimination that the communication connection setting means cannot establish setting of connection with the communication network, and transmits/receives the data stored in the data storage means to/from the communication network.

* * * * *